United States Patent
Wang

(10) Patent No.: US 11,555,895 B2
(45) Date of Patent: Jan. 17, 2023

(54) DYNAMIC COMPENSATION TO POLYGON AND MOTOR TOLERANCE USING GALVO CONTROL PROFILE

(71) Applicant: Innovusion, Inc., Sunnyvale, CA (US)

(72) Inventor: Haosen Wang, Sunnyvale, CA (US)

(73) Assignee: INNOVUSION, INC., Sunnyvale, CA (US)

( * ) Notice: Subject to any disclaimer, the term of this patent is extended or adjusted under 35 U.S.C. 154(b) by 0 days.

(21) Appl. No.: 17/714,077

(22) Filed: Apr. 5, 2022

(65) Prior Publication Data

US 2022/0334228 A1 Oct. 20, 2022

Related U.S. Application Data

(60) Provisional application No. 63/177,289, filed on Apr. 20, 2021.

(51) Int. Cl.
*G01S 7/481* (2006.01)
*G01S 17/931* (2020.01)

(52) U.S. Cl.
CPC .......... *G01S 7/4817* (2013.01); *G01S 7/4814* (2013.01); *G01S 17/931* (2020.01)

(58) Field of Classification Search
None
See application file for complete search history.

(56) References Cited

U.S. PATENT DOCUMENTS

| | | | |
|---|---|---|---|
| 3,897,150 A | 7/1975 | Bridges et al. | |
| 4,412,720 A | 11/1983 | Costa | |
| 4,464,048 A | 8/1984 | Farlow | |
| 5,006,721 A | 4/1991 | Cameron et al. | |
| 5,157,451 A | 10/1992 | Taboada et al. | |

(Continued)

FOREIGN PATENT DOCUMENTS

| CN | 204758260 U | 11/2015 |
|---|---|---|
| CN | 204885804 U | 12/2015 |

(Continued)

OTHER PUBLICATIONS

Sels et al. "Extrinsic Calibration of a Laser Galvanometric Setup and a Range Camera" (Year: 2018).*

(Continued)

*Primary Examiner* — Yuqing Xiao
*Assistant Examiner* — Jempson Noel
(74) *Attorney, Agent, or Firm* — Mauriel Kapouytian Woods LLP; Liang Huang

(57) ABSTRACT

A light detection and ranging system is provided. The system includes a Galvanometer mirror; a multiple-facet light steering device; and a controller device comprising one or more processors, memory, and processor-executable instructions stored in memory. The processor-executable instructions comprise instructions for receiving a first movement profile of the Galvanometer mirror of the LiDAR scanning system; receiving calibration data of the multiple-facet light steering device of the LiDAR scanning system; generating a second movement profile of the Galvanometer mirror based on the calibration data and the first movement profile; and providing one or more control signals to adjust movement of the Galvanometer mirror based on the second movement profile.

29 Claims, 15 Drawing Sheets

(56) References Cited

U.S. PATENT DOCUMENTS

| | | | |
|---|---|---|---|
| 5,303,084 A | 4/1994 | Pflibsen et al. |
| 5,319,434 A | 6/1994 | Croteau et al. |
| 5,369,661 A | 11/1994 | Yamaguchi et al. |
| 5,442,358 A | 8/1995 | Keeler et al. |
| 5,546,188 A | 8/1996 | Wangler et al. |
| 5,579,153 A | 11/1996 | Laming et al. |
| 5,657,077 A | 8/1997 | Deangelis et al. |
| 5,793,491 A | 8/1998 | Wangler et al. |
| 5,838,239 A | 11/1998 | Stern et al. |
| 5,864,391 A | 1/1999 | Hosokawa et al. |
| 5,926,259 A | 7/1999 | Bamberger et al. |
| 5,936,756 A | 8/1999 | Nakajima |
| 6,163,378 A | 12/2000 | Khoury |
| 6,188,078 B1 * | 2/2001 | Bell, Jr. ............... G02B 7/008 |
| | | 250/234 |
| 6,317,202 B1 | 11/2001 | Hosokawa et al. |
| 6,594,000 B2 | 7/2003 | Green et al. |
| 6,650,404 B1 | 11/2003 | Crawford |
| 6,788,445 B2 | 9/2004 | Goldberg et al. |
| 6,950,733 B2 | 9/2005 | Stopczynski |
| 7,128,267 B2 | 10/2006 | Reichenbach et al. |
| 7,202,941 B2 | 4/2007 | Munro |
| 7,345,271 B2 | 3/2008 | Boehlau et al. |
| 7,440,084 B2 | 10/2008 | Kane |
| 7,440,175 B2 | 10/2008 | Di et al. |
| 7,489,865 B2 | 2/2009 | Varshneya et al. |
| 7,576,837 B2 | 8/2009 | Liu et al. |
| 7,830,527 B2 | 11/2010 | Chen et al. |
| 7,835,068 B1 | 11/2010 | Brooks et al. |
| 7,847,235 B2 | 12/2010 | Krupkin et al. |
| 7,869,112 B2 | 1/2011 | Borchers et al. |
| 7,936,448 B2 | 5/2011 | Albuquerque et al. |
| 7,969,558 B2 | 6/2011 | Hall |
| 7,982,861 B2 | 7/2011 | Abshire et al. |
| 8,072,582 B2 | 12/2011 | Meneely |
| 8,471,895 B2 | 6/2013 | Banks |
| 8,736,818 B2 | 5/2014 | Weimer et al. |
| 8,749,764 B2 | 6/2014 | Hsu |
| 8,812,149 B2 | 8/2014 | Doak |
| 8,875,409 B2 | 11/2014 | Kretschmer et al. |
| 8,994,928 B2 | 3/2015 | Shiraishi |
| 9,048,616 B1 | 6/2015 | Robinson |
| 9,065,243 B2 | 6/2015 | Asobe et al. |
| 9,086,273 B1 | 7/2015 | Gruver et al. |
| 9,194,701 B2 | 11/2015 | Bosch |
| 9,255,790 B2 | 2/2016 | Zhu |
| 9,300,321 B2 | 3/2016 | Zalik et al. |
| 9,304,316 B2 | 4/2016 | Weiss et al. |
| 9,316,724 B2 | 4/2016 | Gehring et al. |
| 9,354,485 B2 | 5/2016 | Fermann et al. |
| 9,510,505 B2 | 12/2016 | Halloran et al. |
| 9,575,184 B2 | 2/2017 | Gilliland et al. |
| 9,605,998 B2 | 3/2017 | Nozawa |
| 9,621,876 B2 | 4/2017 | Federspiel |
| 9,638,799 B2 | 5/2017 | Goodwin et al. |
| 9,696,426 B2 | 7/2017 | Zuk |
| 9,702,966 B2 | 7/2017 | Batchelier et al. |
| 9,804,264 B2 | 10/2017 | Villeneuve |
| 9,810,786 B1 | 11/2017 | Welford et al. |
| 9,812,838 B2 | 11/2017 | Villeneuve et al. |
| 9,823,353 B2 | 11/2017 | Eichenholz et al. |
| 9,857,468 B1 | 1/2018 | Eichenholz et al. |
| 9,869,754 B1 | 1/2018 | Campbell et al. |
| 9,880,263 B2 | 1/2018 | Droz et al. |
| 9,880,278 B2 | 1/2018 | Uffelen et al. |
| 9,885,778 B2 | 2/2018 | Dussan |
| 9,897,689 B2 | 2/2018 | Dussan |
| 9,915,726 B2 | 3/2018 | Bailey et al. |
| 9,927,915 B2 | 3/2018 | Frame et al. |
| 9,958,545 B2 | 5/2018 | Eichenholz et al. |
| 10,007,001 B1 | 6/2018 | LaChapelle et al. |
| 10,012,732 B2 | 7/2018 | Eichenholz et al. |
| 10,031,214 B2 | 7/2018 | Rosenzweig et al. |
| 10,042,159 B2 | 8/2018 | Dussan et al. |
| 10,061,019 B1 | 8/2018 | Campbell et al. |
| 10,073,166 B2 | 9/2018 | Dussan |
| 10,078,133 B2 | 9/2018 | Dussan |
| 10,094,925 B1 | 10/2018 | LaChapelle |
| 10,157,630 B2 | 12/2018 | Vaughn et al. |
| 10,191,155 B2 | 1/2019 | Curatu |
| 10,215,847 B2 | 2/2019 | Scheim et al. |
| 10,267,898 B2 | 4/2019 | Campbell et al. |
| 10,295,656 B1 | 5/2019 | Li et al. |
| 10,310,058 B1 | 6/2019 | Campbell et al. |
| 10,324,170 B1 | 6/2019 | Enberg, Jr. et al. |
| 10,324,185 B2 | 6/2019 | McWhirter et al. |
| 10,393,877 B2 | 8/2019 | Hall et al. |
| 10,429,495 B1 | 10/2019 | Wang et al. |
| 10,444,356 B2 | 10/2019 | Wu et al. |
| 10,451,716 B2 | 10/2019 | Hughes et al. |
| 10,466,342 B1 | 11/2019 | Zhu et al. |
| 10,502,831 B2 | 12/2019 | Eichenholz |
| 10,509,112 B1 | 12/2019 | Pan |
| 10,520,602 B2 | 12/2019 | Villeneuve et al. |
| 10,557,923 B2 | 2/2020 | Watnik et al. |
| 10,571,567 B2 | 2/2020 | Campbell et al. |
| 10,578,720 B2 | 3/2020 | Hughes et al. |
| 10,591,600 B2 | 3/2020 | Villeneuve et al. |
| 10,627,491 B2 | 4/2020 | Hall et al. |
| 10,641,872 B2 | 5/2020 | Dussan et al. |
| 10,663,564 B2 | 5/2020 | LaChapelle |
| 10,663,585 B2 | 5/2020 | McWhirter |
| 10,663,596 B2 | 5/2020 | Dussan et al. |
| 10,684,360 B2 | 6/2020 | Campbell |
| 10,908,262 B2 | 2/2021 | Dussan |
| 10,908,265 B2 | 2/2021 | Dussan |
| 10,908,268 B2 | 2/2021 | Zhou et al. |
| 10,908,282 B2 | 2/2021 | Meyers et al. |
| 10,969,475 B2 | 4/2021 | Li et al. |
| 10,983,218 B2 | 4/2021 | Hall et al. |
| 11,002,835 B2 | 5/2021 | Pan et al. |
| 11,009,605 B2 | 5/2021 | Li et al. |
| 11,194,048 B1 | 12/2021 | Burbank et al. |
| 11,353,559 B2 * | 6/2022 | Campbell ............... G02B 26/10 |
| 2002/0136251 A1 | 9/2002 | Green et al. |
| 2004/0135992 A1 | 7/2004 | Munro |
| 2005/0033497 A1 | 2/2005 | Stopczynski |
| 2005/0190424 A1 | 9/2005 | Reichenbach et al. |
| 2005/0195383 A1 | 9/2005 | Breed et al. |
| 2006/0071846 A1 | 4/2006 | Yanagisawa et al. |
| 2006/0132752 A1 | 6/2006 | Kane |
| 2007/0091948 A1 | 4/2007 | Di et al. |
| 2007/0216995 A1 | 9/2007 | Bollond et al. |
| 2008/0174762 A1 | 7/2008 | Liu et al. |
| 2008/0193135 A1 | 8/2008 | Du et al. |
| 2009/0010644 A1 | 1/2009 | Varshneya et al. |
| 2009/0051926 A1 | 2/2009 | Chen |
| 2009/0059201 A1 | 3/2009 | Willner et al. |
| 2009/0067453 A1 | 3/2009 | Mizuuchi et al. |
| 2009/0147239 A1 | 6/2009 | Zhu |
| 2009/0262760 A1 | 10/2009 | Krupkin et al. |
| 2009/0316134 A1 | 12/2009 | Michael et al. |
| 2010/0006760 A1 | 1/2010 | Lee et al. |
| 2010/0020306 A1 | 1/2010 | Hall |
| 2010/0020377 A1 | 1/2010 | Brochers et al. |
| 2010/0027602 A1 | 2/2010 | Abshire et al. |
| 2010/0045965 A1 | 2/2010 | Meneely |
| 2010/0053715 A1 | 3/2010 | O'Neill et al. |
| 2010/0128109 A1 | 5/2010 | Banks |
| 2010/0165322 A1 * | 7/2010 | Kane ...................... G01S 7/481 |
| | | 356/4.01 |
| 2010/0271614 A1 | 10/2010 | Albuquerque et al. |
| 2010/0301024 A1 * | 12/2010 | Unrath ................... B23K 26/08 |
| | | 219/121.81 |
| 2011/0181864 A1 | 7/2011 | Schmitt et al. |
| 2012/0038903 A1 | 2/2012 | Weimer et al. |
| 2012/0124113 A1 | 5/2012 | Zalik et al. |
| 2012/0221142 A1 | 8/2012 | Doak |
| 2013/0107016 A1 | 5/2013 | Federspeil |
| 2013/0116971 A1 | 5/2013 | Retkowski et al. |
| 2013/0241761 A1 | 9/2013 | Cooper et al. |
| 2013/0293867 A1 | 11/2013 | Hsu et al. |
| 2013/0293946 A1 | 11/2013 | Fermann et al. |
| 2013/0329279 A1 | 12/2013 | Nati et al. |

(56) References Cited

U.S. PATENT DOCUMENTS

| | | |
|---|---|---|
| 2013/0342822 A1 | 12/2013 | Shiraishi |
| 2014/0078514 A1 | 3/2014 | Zhu |
| 2014/0104594 A1 | 4/2014 | Gammenthaler |
| 2014/0347650 A1 | 11/2014 | Bosch |
| 2014/0350836 A1 | 11/2014 | Stettner et al. |
| 2015/0078123 A1 | 3/2015 | Batcheller et al. |
| 2015/0084805 A1 | 3/2015 | Dawber |
| 2015/0109603 A1 | 4/2015 | Kim et al. |
| 2015/0116692 A1 | 4/2015 | Zuk et al. |
| 2015/0139259 A1 | 5/2015 | Robinson |
| 2015/0158489 A1 | 6/2015 | Oh et al. |
| 2015/0338270 A1 | 11/2015 | Williams et al. |
| 2015/0355327 A1 | 12/2015 | Goodwin et al. |
| 2016/0003946 A1 | 1/2016 | Gilliland et al. |
| 2016/0047896 A1 | 2/2016 | Dussan |
| 2016/0047900 A1 | 2/2016 | Dussan |
| 2016/0061655 A1 | 3/2016 | Nozawa |
| 2016/0061935 A1 | 3/2016 | Mccloskey et al. |
| 2016/0100521 A1 | 4/2016 | Halloran et al. |
| 2016/0117048 A1 | 4/2016 | Frame et al. |
| 2016/0172819 A1 | 6/2016 | Ogaki |
| 2016/0178736 A1 | 6/2016 | Chung |
| 2016/0226210 A1 | 8/2016 | Zayhowski et al. |
| 2016/0245902 A1 | 8/2016 | Natnik |
| 2016/0291134 A1 | 10/2016 | Droz et al. |
| 2016/0313445 A1 | 10/2016 | Bailey et al. |
| 2016/0327646 A1 | 11/2016 | Scheim et al. |
| 2017/0003116 A1 | 1/2017 | Yee et al. |
| 2017/0153319 A1 | 6/2017 | Villeneuve et al. |
| 2017/0242104 A1 | 8/2017 | Dussan |
| 2017/0299721 A1 | 10/2017 | Eichenholz et al. |
| 2017/0307738 A1 | 10/2017 | Schwarz et al. |
| 2017/0365105 A1 | 12/2017 | Rao et al. |
| 2018/0040171 A1 | 2/2018 | Kundu et al. |
| 2018/0050704 A1 | 2/2018 | Tascione et al. |
| 2018/0069367 A1 | 3/2018 | Villeneuve et al. |
| 2018/0152691 A1 | 5/2018 | Pacala et al. |
| 2018/0156896 A1 | 6/2018 | O'Keeffe |
| 2018/0158471 A1 | 6/2018 | Vaughn et al. |
| 2018/0164439 A1 | 6/2018 | Droz et al. |
| 2018/0188355 A1 | 7/2018 | Bao et al. |
| 2018/0188357 A1 | 7/2018 | Li et al. |
| 2018/0188358 A1 | 7/2018 | Li et al. |
| 2018/0188371 A1 | 7/2018 | Bao et al. |
| 2018/0210084 A1 | 7/2018 | Zwolfer et al. |
| 2018/0275274 A1 | 9/2018 | Bao et al. |
| 2018/0284241 A1 | 10/2018 | Campbell et al. |
| 2018/0284242 A1 | 10/2018 | Campbell |
| 2018/0284286 A1 | 10/2018 | Eichenholz et al. |
| 2018/0329060 A1 | 11/2018 | Pacala et al. |
| 2018/0359460 A1 | 12/2018 | Pacala et al. |
| 2019/0025428 A1 | 1/2019 | Li et al. |
| 2019/0107607 A1 | 4/2019 | Danziger |
| 2019/0107623 A1 | 4/2019 | Campbell et al. |
| 2019/0120942 A1 | 4/2019 | Zhang et al. |
| 2019/0120962 A1 | 4/2019 | Gimpel et al. |
| 2019/0154804 A1 | 5/2019 | Eichenholz |
| 2019/0154807 A1 | 5/2019 | Steinkogler et al. |
| 2019/0212416 A1 | 7/2019 | Li et al. |
| 2019/0250254 A1 | 8/2019 | Campbell et al. |
| 2019/0257924 A1 | 8/2019 | Li et al. |
| 2019/0265334 A1 | 8/2019 | Zhang et al. |
| 2019/0265336 A1* | 8/2019 | Zhang ............... G01S 7/484 |
| 2019/0265337 A1 | 8/2019 | Zhang et al. |
| 2019/0265339 A1 | 8/2019 | Zhang et al. |
| 2019/0277952 A1 | 9/2019 | Beuschel et al. |
| 2019/0310368 A1 | 10/2019 | LaChapelle |
| 2019/0369215 A1 | 12/2019 | Wang et al. |
| 2019/0369258 A1 | 12/2019 | Hall et al. |
| 2019/0383915 A1 | 12/2019 | Li et al. |
| 2020/0142070 A1 | 5/2020 | Hall et al. |
| 2020/0256964 A1 | 8/2020 | Campbell et al. |
| 2020/0284906 A1 | 9/2020 | Eichenholz et al. |
| 2020/0319310 A1 | 10/2020 | Hall et al. |
| 2020/0400798 A1 | 12/2020 | Rezk et al. |
| 2021/0088630 A9 | 3/2021 | Zhang |

FOREIGN PATENT DOCUMENTS

| | | |
|---|---|---|
| CN | 108132472 A | 6/2018 |
| CN | 207457508 U | 6/2018 |
| CN | 207557465 U | 6/2018 |
| CN | 208314210 U | 1/2019 |
| CN | 208421228 U | 1/2019 |
| CN | 208705506 U | 4/2019 |
| CN | 106597471 B | 5/2019 |
| CN | 209280923 U | 8/2019 |
| CN | 108445468 B | 11/2019 |
| CN | 110031823 B | 3/2020 |
| CN | 108089201 B | 4/2020 |
| CN | 109116331 B | 4/2020 |
| CN | 109917408 B | 4/2020 |
| CN | 109116366 B | 5/2020 |
| CN | 109116367 B | 5/2020 |
| CN | 110031822 B | 5/2020 |
| CN | 211655309 U | 10/2020 |
| CN | 109188397 B | 11/2020 |
| CN | 109814086 B | 11/2020 |
| CN | 109917348 B | 11/2020 |
| CN | 110492856 B | 11/2020 |
| CN | 110736975 B | 11/2020 |
| CN | 109725320 B | 12/2020 |
| CN | 110780284 B | 12/2020 |
| CN | 110780283 B | 1/2021 |
| CN | 110784220 B | 2/2021 |
| CN | 212623082 U | 2/2021 |
| CN | 110492349 B | 3/2021 |
| CN | 109950784 B | 5/2021 |
| CN | 213182011 U | 5/2021 |
| CN | 213750313 U | 7/2021 |
| CN | 214151038 U | 9/2021 |
| CN | 109814082 B | 10/2021 |
| CN | 113491043 A | 10/2021 |
| CN | 214795200 U | 11/2021 |
| CN | 214795206 U | 11/2021 |
| CN | 214895784 U | 11/2021 |
| CN | 214895810 U | 11/2021 |
| CN | 215641806 U | 1/2022 |
| CN | 112639527 B | 2/2022 |
| CN | 215932142 U | 3/2022 |
| CN | 112578396 B | 4/2022 |
| EP | 0 757 257 A2 | 2/1997 |
| EP | 1 237 305 A2 | 9/2002 |
| EP | 1 923 721 A1 | 5/2008 |
| EP | 2 157 445 A2 | 2/2010 |
| EP | 2 395 368 A1 | 12/2011 |
| EP | 2 889 642 A1 | 7/2015 |
| GB | 1 427 164 A | 3/1976 |
| GB | 2000411 | 1/1979 |
| JP | 2007144667 A | 6/2007 |
| JP | 2010035385 A | 2/2010 |
| JP | 2017-003347 A | 1/2017 |
| JP | 2017-138301 A | 8/2017 |
| KR | 10-2012-0013515 A | 2/2012 |
| KR | 10-2013-0068224 A | 6/2013 |
| KR | 10-2018-0107673 A | 10/2018 |
| WO | WO-0195010 A2 * | 12/2001 ......... G02B 26/0841 |
| WO | 2017/110417 A1 | 6/2017 |
| WO | 2018/125725 A1 | 7/2018 |
| WO | 2018/129410 A1 | 7/2018 |
| WO | 2018129408 A1 | 7/2018 |
| WO | 2018129409 A1 | 7/2018 |
| WO | 2018129410 A1 | 7/2018 |
| WO | 2018175990 | 9/2018 |
| WO | 2018182812 A2 | 10/2018 |
| WO | 2019079642 | 4/2019 |
| WO | 2019165095 | 8/2019 |
| WO | 2019165289 A1 | 8/2019 |

(56) References Cited

FOREIGN PATENT DOCUMENTS

WO          2019165294          8/2019
WO          2020013890 A2       1/2020

OTHER PUBLICATIONS

Notice of Allowance issued in Korean Patent Application No. 10-2021-7041437 dated Apr. 28, 2022, 6 pages.
"Mirrors", Physics LibreTexts, https://phys.libretexts.org/Bookshelves/Optics/Supplemental_Modules_(Components)/Mirrors, (2021), 2 pages.
"Why Wavelengths Matter in Fiber Optics", FirstLight, https://www.firstlight.net/why-wavelengths-matter-in-fiber-optics/, (2021), 5 pages.
Chen, X, et al. (Feb. 2010). "Polarization Coupling of Light and Optoelectronics Devices Based on Periodically Poled Lithium Niobate," Shanghai Jiao Tong University, China, Frontiers in Guided Wave Optics and Optoelectronics, 24 pages.
Goldstein, R. (Apr. 1986) "Electro-Optic Devices in Review, The Linear Electro-Optic (Pockels) Effect Forms the Basis for a Family of Active Devices," Laser & Applications, FastPulse Technology, Inc., 6 pages.
International Preliminary Report on Patentability, dated Jul. 9, 2019, for International Application No. PCT/US2018/012703, 10 pages.
International Preliminary Report on Patentability, dated Jul. 9, 2019, for International Application No. PCT/US2018/012704, 7 pages.
International Preliminary Report on Patentability, dated Jul. 9, 2019, for International Application No. PCT/US2018/012705, 7 pages.
International Search Report and Written Opinion, dated Jan. 17, 2020, for International Application No. PCT/US2019/019276, 14 pages.
International Search Report and Written Opinion, dated Jul. 9, 2019, for International Application No. PCT/US2019/018987, 17 pages.
International Search Report and Written Opinion, dated Sep. 18, 2018, for International Application No. PCT/US2018/012116, 12 pages.
International Search Report and Written Opinion, dated May 3, 2019, for International Application No. PCT/US2019/019272, 16 pages.
International Search Report and Written Opinion, dated May 6, 2019, for International Application No. PCT/US2019/019264, 15 pages.
International Search Report and Written Opinion, dated Jan. 3, 2019, for International Application No. PCT/US2018/056577, 15 pages.
International Search Report and Written Opinion, dated Mar. 23, 2018, for International Application No. PCT/US2018/012704, 12 pages.
International Search Report and Written Opinion, dated Jun. 7, 2018, for International Application No. PCT/US2018/024185, 9 pages.
International Preliminary Report on Patentability, dated Apr. 30, 2020, for International Application No. PCT/US2018/056577, 8 pages.
European Search Report, dated Jul. 17, 2020, for EP Application No. 18776977.3, 12 pages.
Extended European Search Report, dated Jul. 10, 2020, for EP Application No. 18736738.8, 9 pages.
Gunzung, Kim, et al. (Mar. 2, 2016). "A hybrid 3D LIDAR imager based on pixel-by-pixel scanning and DS-OCDMA," pages Proceedings of SPIE [Proceedings of SPIE ISSN 0277-786X vol. 10524], SPIE, US, vol. 9751, pp. 975119-975119-8.
Extended European Search Report, dated Jul. 22, 2020, for EP Application No. 18736685.1, 10 pages.
Gluckman, J. (May 13, 2016). "Design of the processing chain for a high-altitude, airborne, single-photon lidar mapping instrument," Proceedings of SPIE; [Proceedings of SPIE ISSN 0277-786X vol. 10524], SPIE, US, vol. 9832, 9 pages.
Office Action Issued in Japanese Patent Application No. 2019-536019 dated Nov. 30, 2021, 6 pages.
European Search Report, dated Jun. 17, 2021, for EP Application No. 18868896.4, 7 pages.
"Fiber laser," Wikipedia, https://en.wikipedia.org/wiki/Fiber_laser, 6 pages.
International Search Report and Written Opinion, dated Mar. 19, 2018, for International Application No. PCT/US2018/012705, 12 pages.
International Search Report and Written Opinion, dated Mar. 20, 2018, for International Application No. PCT/US2018/012703, 13 pages.

* cited by examiner

DYNAMIC COMPENSATION TO POLYGON AND MOTOR TOLERANCE USING GALVO CONTROL PROFILE

CROSS-REFERENCE TO RELATED APPLICATIONS

This application claims priority to U.S. Provisional Patent Application Ser. No. 63/177,289, filed Apr. 20, 2021, entitled "DYNAMIC COMPENSATION TO POLYGON AND MOTOR TOLERANCE USING GALVO CONTROL PROFILE," the content of which is hereby incorporated by reference for all purposes.

FIELD OF THE TECHNOLOGY

This disclosure relates generally to optical scanning and, more particularly, to methods and systems for dynamically controlling the movement of a Galvanometer mirror based on calibration data of a multiple-facet light steering device and real time position feedback data.

BACKGROUND

Light detection and ranging (LiDAR) systems use light pulses to create an image or point cloud of the external environment. Some typical LiDAR systems include a light source, a light transmitter, a light steering system, and a light detector. The light source generates a light beam that is directed by the light steering system in particular directions when being transmitted from the LiDAR system. When a transmitted light beam is scattered by an object, a portion of the scattered light returns to the LiDAR system as a return light pulse. The light detector detects the return light pulse. Using the difference between the time that the return light pulse is detected and the time that a corresponding light pulse in the light beam is transmitted, the LiDAR system can determine the distance to the object using the speed of light. The light steering system can direct light beams along different paths to allow the LiDAR system to scan the surrounding environment and produce images or point clouds. LiDAR systems can also use techniques other than time-of-flight and scanning to measure the surrounding environment.

SUMMARY

The present disclosure provides methods and systems for compensating manufacturing-caused non-uniformities and assembly errors in a multiple-facet light steering device (e.g., a polygon mirror), by modifying a Galvanometer mirror movement profile using the calibration data of the light steering device. Methods and systems are further provided for compensating position inaccuracies of the light steering device by further modifying the Galvanometer mirror movement profile using real time position feedback data of the light steering device and/or the real time position feedback data of the Galvanometer mirror. The methods and systems described herein facilitate generating improved scanlines (e.g., straight scanlines) in a LiDAR scanning pattern. The improved LiDAR scanning pattern enhances the efficiencies and accuracies of one or more subsequent processes (e.g., point-cloud based perception). The overall performance of the LiDAR system and the quality of the output point cloud can also be improved.

In one embodiment, the present disclosure provides a light detection and ranging system. The system includes a Galvanometer mirror; a multiple-facet light steering device; and a controller device comprising one or more processors, memory, and processor-executable instructions stored in memory. The processor-executable instructions comprises instructions for receiving a first movement profile of the Galvanometer mirror of the LiDAR scanning system; receiving calibration data of the multiple-facet light steering device of the LiDAR scanning system; generating a second movement profile of the Galvanometer mirror based on the calibration data and the first movement profile; and providing one or more control signals to adjust movement of the Galvanometer mirror based on the second movement profile.

In one embodiment, the present disclosure provides a method for controlling a light detection and ranging (LiDAR) scanning system. The method is performed by one or more processors and memory and comprises receiving a first movement profile of a Galvanometer mirror of the LiDAR scanning system; receiving calibration data of a multiple-facet light steering device of the LiDAR scanning system; generating a second movement profile of the Galvanometer mirror based on the calibration data and the first movement profile; and providing one or more control signals to adjust movement of the Galvanometer mirror based on the second movement profile.

In one embodiment, the present disclosure provides a non-transitory computer readable medium storing processor-executable instructions comprising instructions. The instructions, when executed by one or more processors of an electronic device, cause the electronic device to perform processing comprising receiving a first movement profile of a Galvanometer mirror of the LiDAR scanning system; receiving calibration data of a multiple-facet light steering device of the LiDAR scanning system; generating a second movement profile of the Galvanometer mirror based on the calibration data and the first movement profile; and providing one or more control signals to adjust movement of the Galvanometer mirror based on the second movement profile.

In one embodiment, the present disclosure provides a controller device of a light detection and ranging (LiDAR) scanning system. The controller device comprises one or more processors; memory; and processor-executable instructions stored in memory. The processor-executable instructions comprise instructions for: receiving a first movement profile of a Galvanometer mirror of the LiDAR scanning system; receiving calibration data of a multiple-facet light steering device of the LiDAR scanning system; generating a second movement profile of the Galvanometer mirror based on the calibration data and the first movement profile; and providing one or more control signals to adjust movement of the Galvanometer mirror based on the second movement profile.

In one embodiment, the present disclosure provides a vehicle comprising a light detection and ranging (LiDAR) scanning system. The system includes a Galvanometer mirror; a multiple-facet light steering device; and a controller device comprising one or more processors, memory, and processor-executable instructions stored in memory. The processor-executable instructions comprises instructions for receiving a first movement profile of the Galvanometer mirror of the LiDAR scanning system; receiving calibration data of the multiple-facet light steering device of the LiDAR scanning system; generating a second movement profile of the Galvanometer mirror based on the calibration data and the first movement profile; and providing one or more control signals to adjust movement of the Galvanometer mirror based on the second movement profile.

BRIEF DESCRIPTION OF THE DRAWINGS

The present disclosure can be best understood by reference to the figures described below taken in conjunction with the accompanying drawing figures, in which like parts may be referred to by like numerals.

DETAILED DESCRIPTION

Figure 1:
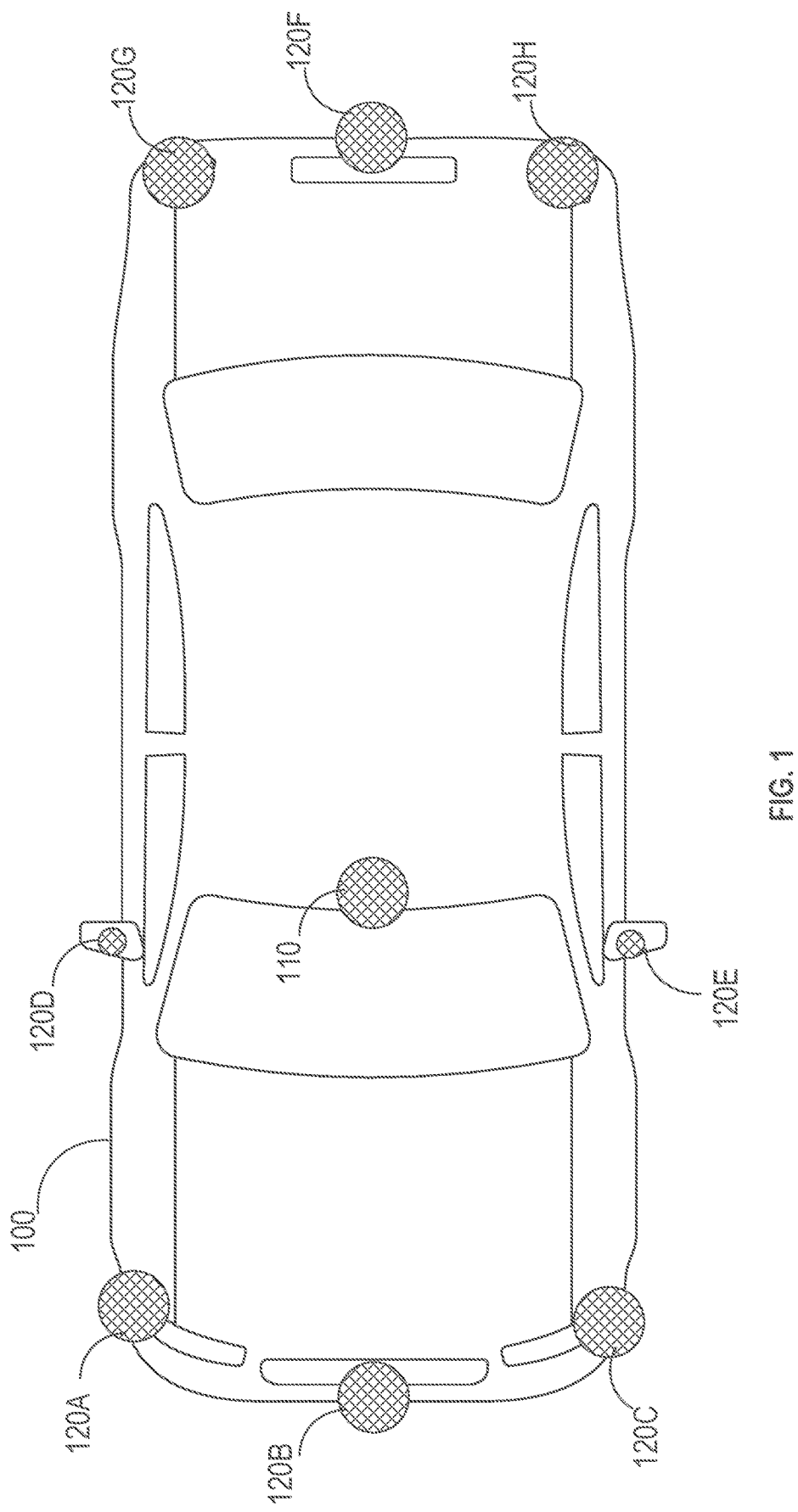
FIG. 1 illustrates one or more exemplary LiDAR systems disposed or included in a motor vehicle.

To provide a more thorough understanding of the present invention, the following description sets forth numerous specific details, such as specific configurations, parameters, examples, and the like. It should be recognized, however, that such description is not intended as a limitation on the scope of the present invention but is intended to provide a better description of the exemplary embodiments.

Throughout the specification and claims, the following terms take the meanings explicitly associated herein, unless the context clearly dictates otherwise:

The phrase "in one embodiment" as used herein does not necessarily refer to the same embodiment, though it may. Thus, as described below, various embodiments of the disclosure may be readily combined, without departing from the scope or spirit of the invention.

As used herein, the term "or" is an inclusive "or" operator and is equivalent to the term "and/or," unless the context clearly dictates otherwise.

The term "based on" is not exclusive and allows for being based on additional factors not described unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of a networked environment where two or more components or devices are able to exchange data, the terms "coupled to" and "coupled with" are also used to mean "communicatively coupled with", possibly via one or more intermediary devices.

Although the following description uses terms "first," "second," etc. to describe various elements, these elements should not be limited by the terms. These terms are only used to distinguish one element from another. For example, a first sensor could be termed a second sensor and, similarly, a second sensor could be termed a first sensor, without departing from the scope of the various described examples. The first sensor and the second sensor can both be sensors and, in some cases, can be separate and different sensors.

In addition, throughout the specification, the meaning of "a", "an", and "the" includes plural references, and the meaning of "in" includes "in" and "on".

Although some of the various embodiments presented herein constitute a single combination of inventive elements, it should be appreciated that the inventive subject matter is considered to include all possible combinations of the disclosed elements. As such, if one embodiment comprises elements A, B, and C, and another embodiment comprises elements B and D, then the inventive subject matter is also considered to include other remaining combinations of A, B, C, or D, even if not explicitly discussed herein. Further, the transitional term "comprising" means to have as parts or members, or to be those parts or members. As used herein, the transitional term "comprising" is inclusive or open-ended and does not exclude additional, unrecited elements or method steps.

Throughout the following disclosure, numerous references may be made regarding servers, services, interfaces, engines, modules, clients, peers, portals, platforms, or other systems formed from computing devices. It should be appreciated that the use of such terms is deemed to represent one or more computing devices having at least one processor (e.g., ASIC, FPGA, PLD, DSP, x86, ARM, RISC-V, Cold-Fire, GPU, multi-core processors, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable medium storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, a circuit-switched network, the Internet, LAN, WAN, VPN, or other type of network.

As used in the description herein and throughout the claims that follow, when a system, engine, server, device, module, or other computing element is described as being configured to perform or execute functions on data in a memory, the meaning of "configured to" or "programmed to" is defined as one or more processors or cores of the computing element being programmed by a set of software instructions stored in the memory of the computing element to execute the set of functions on target data or data objects stored in the memory.

It should be noted that any language directed to a computer should be read to include any suitable combination of computing devices or network platforms, including servers, interfaces, systems, databases, agents, peers, engines, controllers, modules, or other types of computing devices operating individually or collectively. One should appreciate the computing devices comprise a processor configured to execute software instructions stored on a tangible, non-transitory computer readable storage medium (e.g., hard drive, FPGA, PLA, solid state drive, RAM, flash, ROM, etc.). The software instructions configure or program the computing device to provide the roles, responsibilities, or other functionality as discussed below with respect to the disclosed apparatus. Further, the disclosed technologies can be embodied as a computer program product that includes a non-transitory computer readable medium storing the software instructions that causes a processor to execute the disclosed steps associated with implementations of computer-based algorithms, processes, methods, or other instructions. In some embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges among devices can be conducted over a packet-switched network, the Internet, LAN, WAN, VPN, or other type of packet switched network; a circuit switched network; cell switched network; or other type of network.

A LiDAR system is a type of three-dimensional depth sensor. In a LiDAR scanning system, a rotatable polygon mirror and a Galvanometer mirror are used in a light steering mechanism to scan the laser light to illuminate objects in a field-of-view (FOV) and to direct return light to the receiver of the LiDAR system. The polygon mirror can be made from, for example, metal, polycarbonate, and/or glass. The metal-based polygon mirror is widely used due to its matured manufacturing process. Typically, the metal-based polygon mirror is machined by using computer numerical control (CNC) equipment with diamond turning. Diamond turning is turning using a cutting tool with a diamond tip. The diamond turning process is used for mechanical machining of precision elements such as optical components. The diamond turning process is highly precise, but the CNC process with diamond turning limits the production volume due to its long machining time.

For high volume applications such as automotive sensor, metal-based polygon mirror cannot meet the volume production requirement. Therefore, other types of polygon mirrors such as polycarbonate molded- or glass molded- polygon mirrors are more practical. Those molded polygon mirrors can achieve very low cost and high production volume. But in mass production of molded polygon mirrors, the uniformity of the different facets of a polygon mirror is difficult to control. A polygon mirror has multiple reflective side surfaces or facets that reflect light. A polygon mirror can be used to direct transmission light to an FOV and direct return light to the receiver of the LiDAR system. The uniformity of the reflective facets of the polygon mirror can thus be important because differences caused by the non-uniformity among the facets may degrade the accuracy of the LiDAR scanning pattern (e.g., causing non-continuous scanlines).

In addition, the process of assembling a motor with a polygon mirror may also introduce accumulated assembly errors. A motor is used to rotate the polygon mirror. When the polygon mirror rotates, assembly errors may affect the light reflection capabilities of different reflective surfaces of the polygon mirror and in turn also degrade the accuracy of the LiDAR scanning pattern. For optical devices like a LiDAR system, deviations from ideal scanning patterns (e.g., caused by non-continuous scanlines) affect the resulting point cloud quality and accuracy, which in turn may degrade the subsequent perception accuracy. Therefore, it is needed to reduce or cancel the non-uniformity differences among different facets of the polygon mirror and the assembly errors. The present disclosure provides methods and systems for compensating the manufacturing-caused non-uniformity differences of the light steering device (e.g., a polygon mirror) and assembly errors, by modifying the movement profile of the Galvanometer mirror using the calibration data of the polygon mirror and real time position feedback data.

FIG. 1 illustrates one or more exemplary LiDAR systems 110 disposed or included in a motor vehicle 100. Motor vehicle 100 can be a vehicle having any automated level. For example, motor vehicle 100 can be a partially automated vehicle, a highly automated vehicle, a fully automated vehicle, or a driverless vehicle. A partially automated vehicle can perform some driving functions without a human driver's intervention. For example, a partially automated vehicle can perform blind-spot monitoring, lane keeping and/or lane changing operations, automated emergency braking, smart cruising and/or traffic following, or the like. Certain operations of a partially automated vehicle may be limited to specific applications or driving scenarios (e.g., limited to only freeway driving). A highly automated vehicle can generally perform all operations of a partially automated vehicle but with less limitations. A highly automated vehicle can also detect its own limits in operating the vehicle and ask the driver to take over the control of the vehicle when necessary. A fully automated vehicle can perform all vehicle operations without a driver's intervention but can also detect its own limits and ask the driver to take over when necessary. A driverless vehicle can operate on its own without any driver intervention.

In typical configurations, motor vehicle 100 comprises one or more LiDAR systems 110 and 120A-F. Each of LiDAR systems 110 and 120A-F can be a scanning-based LiDAR system and/or a non-scanning LiDAR system (e.g., a flash LiDAR). A scanning-based LiDAR system scans one or more light beams in one or more directions (e.g., horizontal and vertical directions) to detect objects in a field-of-view (FOV). A non-scanning based LiDAR system transmits laser light to illuminate an FOV without scanning. For example, a flash LiDAR is a type of non-scanning based LiDAR system. A flash LiDAR can transmit laser light to simultaneously illuminate an FOV using a single light pulse or light shot.

A LiDAR system is often an essential sensor of a vehicle that is at least partially automated. In one embodiment, as shown in FIG. 1, motor vehicle 100 may include a single LiDAR system 110 (e.g., without LiDAR systems 120A-F) disposed at the highest position of the vehicle (e.g., at the vehicle roof). Disposing LiDAR system 110 at the vehicle roof facilitates a 360-degree scanning around vehicle 100. In some other embodiments, motor vehicle 100 can include multiple LiDAR systems, including two or more of systems 110 and/or 120A-F. As shown in FIG. 1, in one embodiment, multiple LiDAR systems 110 and/or 120A-F are attached to vehicle 100 at different locations of the vehicle. For example, LiDAR system 120A is attached to vehicle 100 at the front right corner; LiDAR system 120B is attached to vehicle 100 at the front center; LiDAR system 120C is attached to vehicle 100 at the front left corner; LiDAR system 120D is attached to vehicle 100 at the right-side rear view mirror; LiDAR system 120E is attached to vehicle 100 at the left-side rear view mirror; and/or LiDAR system 120F is attached to vehicle 100 at the back center. In some embodiments, LiDAR systems 110 and 120A-F are independent LiDAR systems having their own respective laser sources, control electronics, transmitters, receivers, and/or steering mechanisms. In other embodiments, some of LiDAR systems 110 and 120A-F can share one or more components, thereby forming a distributed sensor system. In one example, optical fibers are used to deliver laser light from a centralized laser source to all LiDAR systems. It is understood that one or more LiDAR systems can be distributed and attached to a vehicle in any desired manner and FIG. 1 only illustrates one embodiment. As another example, LiDAR systems 120D and 120E may be attached to the B-pillars of vehicle 100 instead of the rear-view mirrors. As another example, LiDAR system 120B may be attached to the windshield of vehicle 100 instead of the front bumper.

Figure 2:
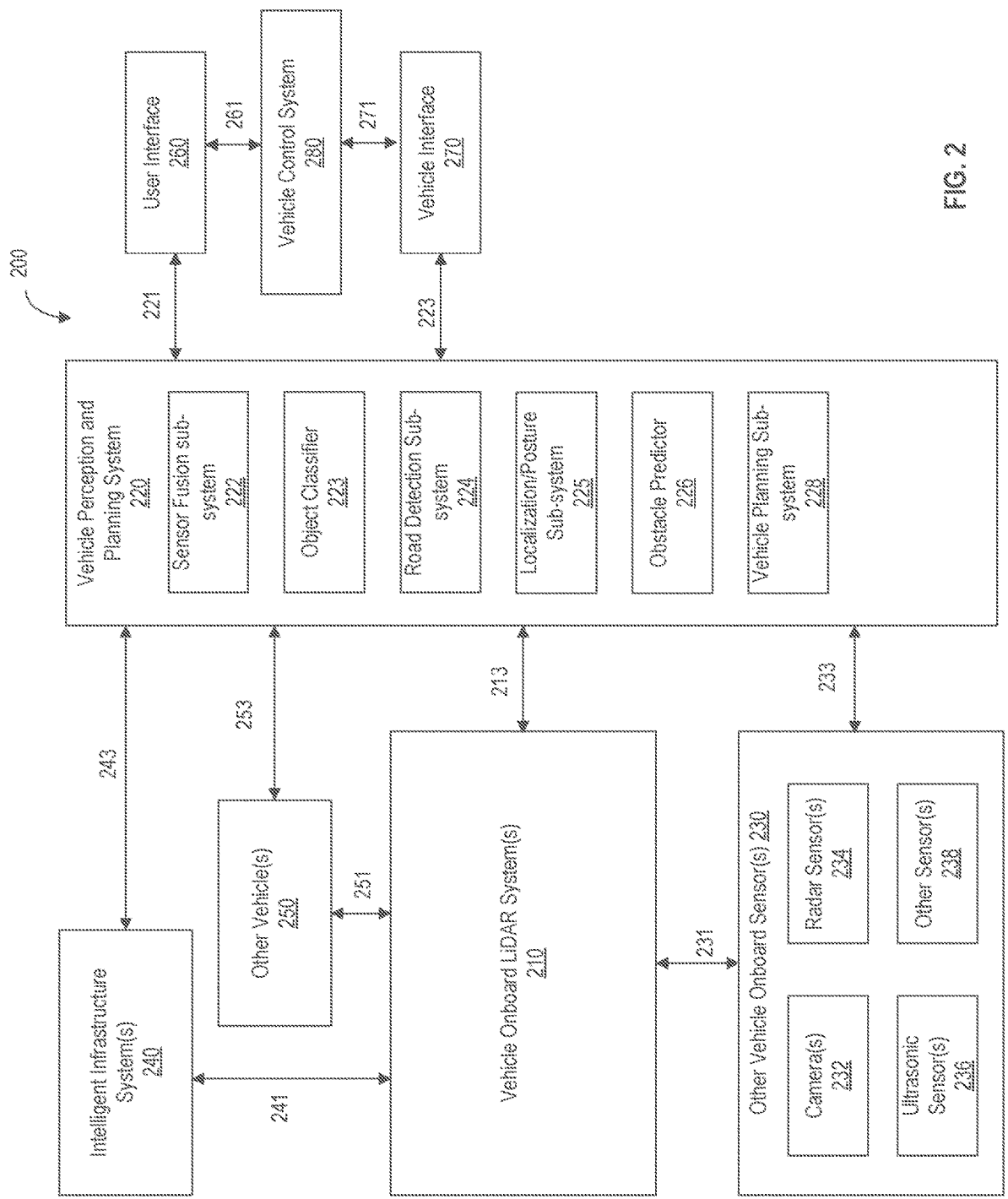
FIG. 2 is a block diagram illustrating interactions between an exemplary LiDAR system and multiple other systems including a vehicle perception and planning system.

FIG. 2 is a block diagram 200 illustrating interactions between vehicle onboard LiDAR system(s) 210 and multiple other systems including a vehicle perception and planning system 220. LiDAR system(s) 210 can be mounted on or integrated to a vehicle. LiDAR system(s) 210 include sensor(s) that scan laser light to the surrounding environment to measure the distance, angle, and/or velocity of objects. Based on the scattered light that returned to LiDAR system(s) 210, it can generate sensor data (e.g., image data or 3D point cloud data) representing the perceived external environment.

LiDAR system(s) 210 can include one or more of short-range LiDAR sensors, medium-range LiDAR sensors, and long-range LiDAR sensors. A short-range LiDAR sensor measures objects located up to about 20-40 meters from the LiDAR sensor. Short-range LiDAR sensors can be used for, e.g., monitoring nearby moving objects (e.g., pedestrians crossing street in a school zone), parking assistance applications, or the like. A medium-range LiDAR sensor measures objects located up to about 100-150 meters from the LiDAR sensor. Medium-range LiDAR sensors can be used for, e.g., monitoring road intersections, assistance for merging onto or leaving a freeway, or the like. A long-range LiDAR sensor measures objects located up to about 150-300 meters. Long-range LiDAR sensors are typically used when a vehicle is travelling at high speed (e.g., on a freeway), such that the vehicle's control systems may only have a few seconds (e.g., 6-8 seconds) to respond to any situations detected by the LiDAR sensor. As shown in FIG. 2, in one embodiment, the LiDAR sensor data can be provided to vehicle perception and planning system 220 via a communication path 213 for further processing and controlling the vehicle operations. Communication path 213 can be any wired or wireless communication links that can transfer data.

With reference still to FIG. 2, in some embodiments, other vehicle onboard sensor(s) 230 are used to provide additional sensor data separately or together with LiDAR system(s) 210. Other vehicle onboard sensors 230 may include, for example, one or more camera(s) 232, one or more radar(s) 234, one or more ultrasonic sensor(s) 236, and/or other sensor(s) 238. Camera(s) 232 can take images and/or videos of the external environment of a vehicle. Camera(s) 232 can take, for example, high-definition (HD) videos having millions of pixels in each frame. A camera produces monochrome or color images and videos. Color information may be important in interpreting data for some situations (e.g., interpreting images of traffic lights). Color information may not be available from other sensors such as LiDAR or radar sensors. Camera(s) 232 can include one or more of narrow-focus cameras, wider-focus cameras, side-facing cameras, infrared cameras, fisheye cameras, or the like. The image and/or video data generated by camera(s) 232 can also be provided to vehicle perception and planning system 220 via communication path 233 for further processing and controlling the vehicle operations. Communication path 233 can be any wired or wireless communication links that can transfer data.

Other vehicle onboard sensor(s) 230 can also include radar sensor(s) 234. Radar sensor(s) 234 use radio waves to determine the range, angle, and velocity of objects. Radar sensor(s) 234 produce electromagnetic waves in the radio or microwave spectrum. The electromagnetic waves reflect off an object and some of the reflected waves return to the radar sensor, thereby providing information about the object's position and velocity. Radar sensor(s) 234 can include one or more of short-range radar(s), medium-range radar(s), and long-range radar(s). A short-range radar measures objects located at about 0.1-30 meters from the radar. A short-range radar is useful in detecting objects located nearby the vehicle, such as other vehicles, buildings, walls, pedestrians, bicyclists, etc. A short-range radar can be used to detect a blind spot, assist in lane changing, provide rear-end collision warning, assist in parking, provide emergency braking, or the like. A medium-range radar measures objects located at about 30-80 meters from the radar. A long-range radar measures objects located at about 80-200 meters. Medium- and/or long-range radars can be useful in, for example, traffic following, adaptive cruise control, and/or highway automatic braking. Sensor data generated by radar sensor(s) 234 can also be provided to vehicle perception and planning system 220 via communication path 233 for further processing and controlling the vehicle operations.

Other vehicle onboard sensor(s) 230 can also include ultrasonic sensor(s) 236. Ultrasonic sensor(s) 236 use acoustic waves or pulses to measure object located external to a vehicle. The acoustic waves generated by ultrasonic sensor(s) 236 are transmitted to the surrounding environment. At least some of the transmitted waves are reflected off an object and return to the ultrasonic sensor(s) 236. Based on the return signals, a distance of the object can be calculated. Ultrasonic sensor(s) 236 can be useful in, for example, check blind spot, identify parking spots, provide lane changing assistance into traffic, or the like. Sensor data generated by ultrasonic sensor(s) 236 can also be provided to vehicle perception and planning system 220 via communication path 233 for further processing and controlling the vehicle operations.

In some embodiments, one or more other sensor(s) 238 may be attached in a vehicle and may also generate sensor data. Other sensor(s) 238 may include, for example, global positioning systems (GPS), inertial measurement units (IMU), or the like. Sensor data generated by other sensor(s) 238 can also be provided to vehicle perception and planning system 220 via communication path 233 for further processing and controlling the vehicle operations. It is understood that communication path 233 may include one or more communication links to transfer data between the various sensor(s) 230 and vehicle perception and planning system 220.

In some embodiments, as shown in FIG. 2, sensor data from other vehicle onboard sensor(s) 230 can be provided to vehicle onboard LiDAR system(s) 210 via communication path 231. LiDAR system(s) 210 may process the sensor data from other vehicle onboard sensor(s) 230. For example, sensor data from camera(s) 232, radar sensor(s) 234, ultrasonic sensor(s) 236, and/or other sensor(s) 238 may be correlated or fused with sensor data LiDAR system(s) 210, thereby at least partially offloading the sensor fusion process performed by vehicle perception and planning system 220. It is understood that other configurations may also be implemented for transmitting and processing sensor data from the various sensors (e.g., data can be transmitted to a cloud service for processing and then the processing results can be transmitted back to the vehicle perception and planning system 220).

With reference still to FIG. 2, in some embodiments, sensors onboard other vehicle(s) 250 are used to provide additional sensor data separately or together with LiDAR system(s) 210. For example, two or more nearby vehicles may have their own respective LiDAR sensor(s), camera(s), radar sensor(s), ultrasonic sensor(s), etc. Nearby vehicles can communicate and share sensor data with one another. Communications between vehicles are also referred to as V2V (vehicle to vehicle) communications. For example, as shown in FIG. 2, sensor data generated by other vehicle(s) 250 can be communicated to vehicle perception and planning system 220 and/or vehicle onboard LiDAR system(s) 210, via communication path 253 and/or communication path 251, respectively. Communication paths 253 and 251 can be any wired or wireless communication links that can transfer data.

Sharing sensor data facilitates a better perception of the environment external to the vehicles. For instance, a first vehicle may not sense a pedestrian that is a behind a second vehicle but is approaching the first vehicle. The second vehicle may share the sensor data related to this pedestrian with the first vehicle such that the first vehicle can have additional reaction time to avoid collision with the pedestrian. In some embodiments, similar to data generated by sensor(s) 230, data generated by sensors onboard other vehicle(s) 250 may be correlated or fused with sensor data generated by LiDAR system(s) 210, thereby at least partially offloading the sensor fusion process performed by vehicle perception and planning system 220.

In some embodiments, intelligent infrastructure system(s) 240 are used to provide sensor data separately or together with LiDAR system(s) 210. Certain infrastructures may be configured to communicate with a vehicle to convey information and vice versa. Communications between a vehicle and infrastructures are generally referred to as V2I (vehicle to infrastructure) communications. For example, intelligent infrastructure system(s) 240 may include an intelligent traffic light that can convey its status to an approaching vehicle in a message such as "changing to yellow in 5 seconds." Intelligent infrastructure system(s) 240 may also include its own LiDAR system mounted near an intersection such that it can convey traffic monitoring information to a vehicle. For example, a left-turning vehicle at an intersection may not have sufficient sensing capabilities because some of its own sensors may be blocked by traffics in the opposite direction. In such a situation, sensors of intelligent infrastructure system(s) 240 can provide useful, and sometimes vital, data to the left-turning vehicle. Such data may include, for example, traffic conditions, information of objects in the direction the vehicle is turning to, traffic light status and predictions, or the like. These sensor data generated by intelligent infrastructure system(s) 240 can be provided to vehicle perception and planning system 220 and/or vehicle onboard LiDAR system(s) 210, via communication paths 243 and/or 241, respectively. Communication paths 243 and/or 241 can include any wired or wireless communication links that can transfer data. For example, sensor data from intelligent infrastructure system(s) 240 may be transmitted to LiDAR system(s) 210 and correlated or fused with sensor data generated by LiDAR system(s) 210, thereby at least partially offloading the sensor fusion process performed by vehicle perception and planning system 220. V2V and V2I communications described above are examples of vehicle-to-X (V2X) communications, where the "X" represents any other devices, systems, sensors, infrastructure, or the like that can share data with a vehicle.

With reference still to FIG. 2, via various communication paths, vehicle perception and planning system 220 receives sensor data from one or more of LiDAR system(s) 210, other vehicle onboard sensor(s) 230, other vehicle(s) 250, and/or intelligent infrastructure system(s) 240. In some embodiments, different types of sensor data are correlated and/or integrated by a sensor fusion sub-system 222. For example, sensor fusion sub-system 222 can generate a 360-degree model using multiple images or videos captured by multiple cameras disposed at different positions of the vehicle. Sensor fusion sub-system 222 obtains sensor data from different types of sensors and uses the combined data to perceive the environment more accurately. For example, a vehicle onboard camera 232 may not capture a clear image because it is facing the sun or a light source (e.g., another vehicle's headlight during nighttime) directly. A LiDAR system 210 may not be affected as much and therefore sensor fusion sub-system 222 can combine sensor data provided by both camera 232 and LiDAR system 210, and use the sensor data provided by LiDAR system 210 to compensate the unclear image captured by camera 232. As another example, in a rainy or foggy weather, a radar sensor 234 may work better than a camera 232 or a LiDAR system 210. Accordingly, sensor fusion sub-system 222 may use sensor data provided by the radar sensor 234 to compensate the sensor data provided by camera 232 or LiDAR system 210.

In other examples, sensor data generated by other vehicle onboard sensor(s) 230 may have a lower resolution (e.g., radar sensor data) and thus may need to be correlated and confirmed by LiDAR system(s) 210, which usually has a higher resolution. For example, a sewage cover (also referred to as a manhole cover) may be detected by radar sensor 234 as an object towards which a vehicle is approaching. Due to the low-resolution nature of radar sensor 234, vehicle perception and planning system 220 may not be able to determine whether the object is an obstacle that the vehicle needs to avoid. High-resolution sensor data generated by LiDAR system(s) 210 thus can be used to correlated and confirm that the object is a sewage cover and causes no harm to the vehicle.

Vehicle perception and planning system 220 further comprises an object classifier 223. Using raw sensor data and/or correlated/fused data provided by sensor fusion sub-system 222, object classifier 223 can detect and classify the objects and estimate the positions of the objects. In some embodiments, object classifier 233 can use machine-learning based techniques to detect and classify objects. Examples of the machine-learning based techniques include utilizing algorithms such as region-based convolutional neural networks (R-CNN), Fast R-CNN, Faster R-CNN, histogram of oriented gradients (HOG), region-based fully convolutional network (R-FCN), single shot detector (SSD), spatial pyramid pooling (SPP-net), and/or You Only Look Once (Yolo).

Vehicle perception and planning system 220 further comprises a road detection sub-system 224. Road detection sub-system 224 localizes the road and identifies objects and/or markings on the road. For example, based on raw or fused sensor data provided by radar sensor(s) 234, camera(s) 232, and/or LiDAR system(s) 210, road detection sub-system 224 can build a 3D model of the road based on machine-learning techniques (e.g., pattern recognition algorithms for identifying lanes). Using the 3D model of the road, road detection sub-system 224 can identify objects (e.g., obstacles or debris on the road) and/or markings on the road (e.g., lane lines, turning marks, crosswalk marks, or the like).

Vehicle perception and planning system 220 further comprises a localization and vehicle posture sub-system 225. Based on raw or fused sensor data, localization and vehicle posture sub-system 225 can determine position of the vehicle and the vehicle's posture. For example, using sensor data from LiDAR system(s) 210, camera(s) 232, and/or GPS data, localization and vehicle posture sub-system 225 can determine an accurate position of the vehicle on the road and the vehicle's six degrees of freedom (e.g., whether the vehicle is moving forward or backward, up or down, and left or right). In some embodiments, high-definition (HD) maps are used for vehicle localization. HD maps can provide highly detailed, three-dimensional, computerized maps that pinpoint a vehicle's location. For instance, using the HD maps, localization and vehicle posture sub-system 225 can determine precisely the vehicle's current position (e.g., which lane of the road the vehicle is currently in, how close it is to a curb or a sidewalk) and predict vehicle's future positions.

Vehicle perception and planning system 220 further comprises obstacle predictor 226. Objects identified by object classifier 223 can be stationary (e.g., a light pole, a road sign) or dynamic (e.g., a moving pedestrian, bicycle, another car). For moving objects, predicting their moving path or future positions can be important to avoid collision. Obstacle predictor 226 can predict an obstacle trajectory and/or warn the driver or the vehicle planning sub-system 228 about a potential collision. For example, if there is a high likelihood that the obstacle's trajectory intersects with the vehicle's current moving path, obstacle predictor 226 can generate such a warning. Obstacle predictor 226 can use a variety of techniques for making such a prediction. Such techniques include, for example, constant velocity or acceleration models, constant turn rate and velocity/acceleration models, Kalman Filter and Extended Kalman Filter based models, recurrent neural network (RNN) based models, long short-term memory (LSTM) neural network based models, encoder-decoder RNN models, or the like.

With reference still to FIG. 2, in some embodiments, vehicle perception and planning system 220 further comprises vehicle planning sub-system 228. Vehicle planning sub-system 228 can include a route planner, a driving behaviors planner, and a motion planner. The route planner can plan the route of a vehicle based on the vehicle's current location data, target location data, traffic information, etc. The driving behavior planner adjusts the timing and planned movement based on how other objects might move, using the obstacle prediction results provided by obstacle predictor 226. The motion planner determines the specific operations the vehicle needs to follow. The planning results are then communicated to vehicle control system 280 via vehicle interface 270. The communication can be performed through communication paths 223 and 271, which include any wired or wireless communication links that can transfer data.

Vehicle control system 280 controls the vehicle's steering mechanism, throttle, brake, etc., to operate the vehicle according to the planned route and movement. Vehicle perception and planning system 220 may further comprise a user interface 260, which provides a user (e.g., a driver) access to vehicle control system 280 to, for example, override or take over control of the vehicle when necessary. User interface 260 can communicate with vehicle perception and planning system 220, for example, to obtain and display raw or fused sensor data, identified objects, vehicle's location/posture, etc. These displayed data can help a user to better operate the vehicle. User interface 260 can communicate with vehicle perception and planning system 220 and/or vehicle control system 280 via communication paths 221 and 261 respectively, which include any wired or wireless communication links that can transfer data. It is understood that the various systems, sensors, communication links, and interfaces in FIG. 2 can be configured in any desired manner and not limited to the configuration shown in FIG. 2.

Figure 3:
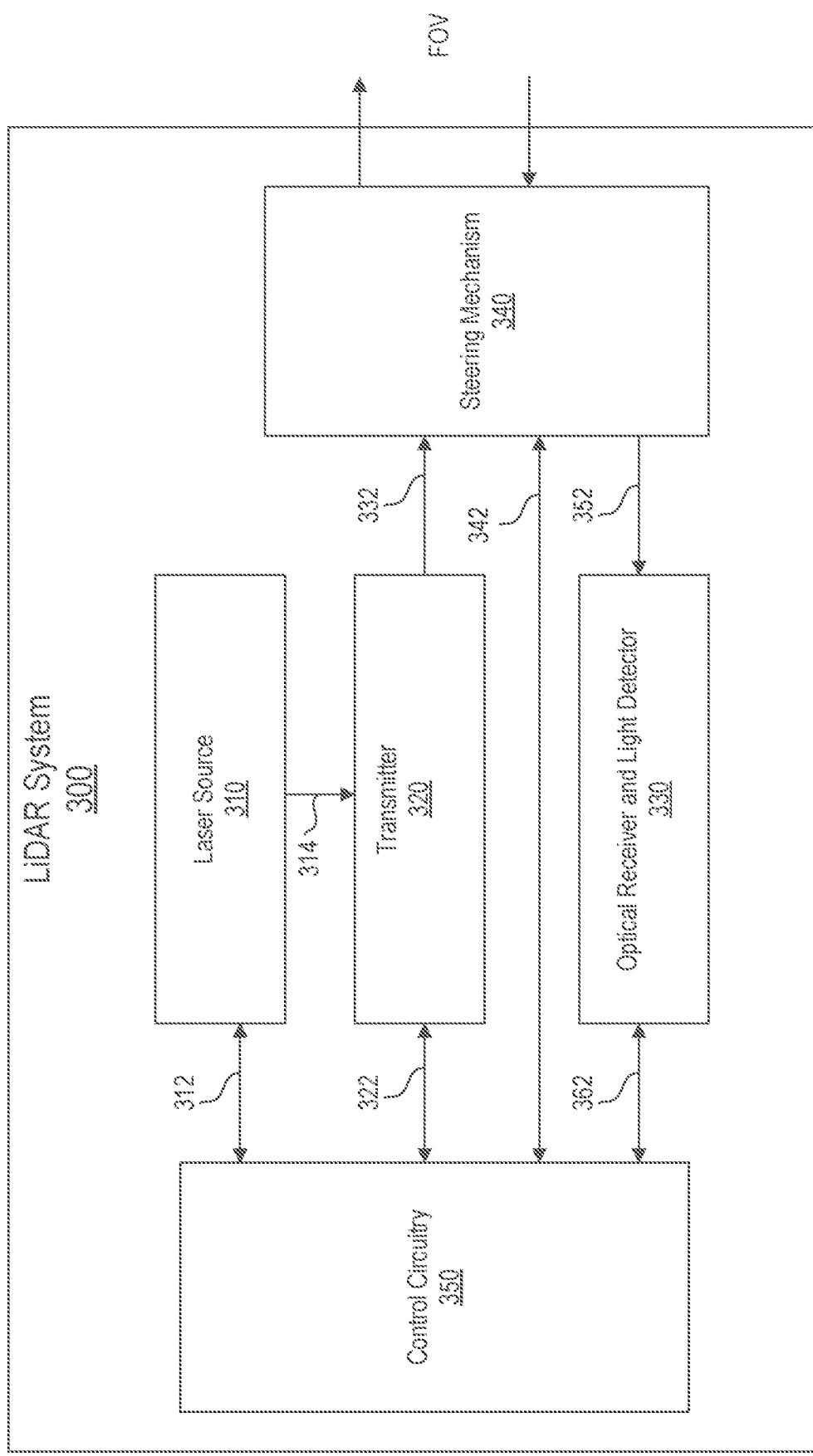
FIG. 3 is a block diagram illustrating an exemplary LiDAR system.

FIG. 3 is a block diagram illustrating an exemplary LiDAR system 300. LiDAR system 300 can be used to implement LiDAR system 110, 120A-F, and/or 210 shown in FIGS. 1 and 2. In one embodiment, LiDAR system 300 comprises a laser source 310, a transmitter 320, an optical receiver and light detector 330, a steering system 340, and a control circuitry 350. These components are coupled together using communications paths 312, 314, 322, 332, 343, 352, and 362. These communications paths include communication links (wired or wireless, bidirectional or unidirectional) among the various LiDAR system components, but need not be physical components themselves. While the communications paths can be implemented by one or more electrical wires, buses, or optical fibers, the communication paths can also be wireless channels or free-space optical paths so that no physical communication medium is present. For example, in one embodiment of LiDAR system 300, communication path 314 between laser source 310 and transmitter 320 may be implemented using one or more optical fibers. Communication paths 332 and 352 may represent optical paths implemented using free space optical components and/or optical fibers. And communication paths 312, 322, 342, and 362 may be implemented using one or more electrical wires that carry electrical signals. The communications paths can also include one or more of the above types of communication mediums (e.g., they can include an optical fiber and a free-space optical component, or include one or more optical fibers and one or more electrical wires).

LiDAR system 300 can also include other components not depicted in FIG. 3, such as power buses, power supplies, LED indicators, switches, etc. Additionally, other communication connections among components may be present, such as a direct connection between light source 310 and optical receiver and light detector 330 to provide a reference signal so that the time from when a light pulse is transmitted until a return light pulse is detected can be accurately measured.

Laser source 310 outputs laser light for illuminating objects in a field of view (FOV). Laser source 310 can be, for example, a semiconductor-based laser (e.g., a diode laser) and/or a fiber-based laser. A semiconductor-based laser can be, for example, an edge emitting laser (EEL), a vertical cavity surface emitting laser (VCSEL), or the like. A fiber-based laser is a laser in which the active gain medium is an optical fiber doped with rare-earth elements such as erbium, ytterbium, neodymium, dysprosium, praseodymium, thulium and/or holmium. In some embodiments, a fiber laser is based on double-clad fibers, in which the gain medium forms the core of the fiber surrounded by two layers of cladding. The double-clad fiber allows the core to be pumped with a high-power beam, thereby enabling the laser source to be a high power fiber laser source.

In some embodiments, laser source 310 comprises a master oscillator (also referred to as a seed laser) and power amplifier (MOPA). The power amplifier amplifies the output power of the seed laser. The power amplifier can be a fiber amplifier, a bulk amplifier, or a semiconductor optical amplifier. The seed laser can be a diode laser (e.g., a Fabry-Perot cavity laser, a distributed feedback laser), a solid-state bulk laser, or a tunable external-cavity diode laser. In some embodiments, laser source 310 can be an optically pumped microchip laser. Microchip lasers are alignment-free monolithic solid-state lasers where the laser crystal is directly contacted with the end mirrors of the laser resonator. A microchip laser is typically pumped with a laser diode (directly or using a fiber) to obtain the desired output power. A microchip laser can be based on neodymium-doped yttrium aluminum garnet ($Y_3Al_5O_{12}$) laser crystals (i.e., Nd:YAG), or neodymium-doped vanadate (i.e., ND:YVO$_4$) laser crystals.

Figure 4:
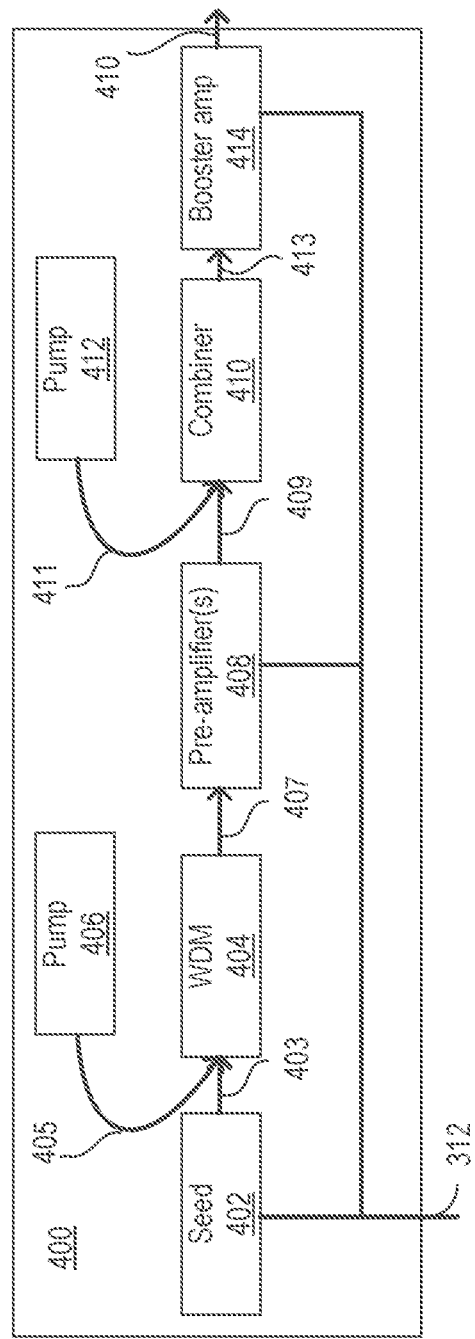
FIG. 4 is a block diagram illustrating an exemplary fiber-based laser source.

FIG. 4 is a block diagram illustrating an exemplary fiber-based laser source 400 having a seed laser and one or more pumps (e.g., laser diodes) for pumping desired output power. Fiber-based laser source 400 is an example of laser source 310 depicted in FIG. 3. In some embodiments, fiber-based laser source 400 comprises a seed laser 402 to generate initial light pulses of one or more wavelengths (e.g., 1550 nm), which are provided to a wavelength-division multiplexor (WDM) 404 via an optical fiber 403. Fiber-based laser source 400 further comprises a pump 406 for providing laser power (e.g., of a different wavelength, such as 980 nm) to WDM 404 via an optical fiber 405. WDM 404 multiplexes the light pulses provided by seed laser 402 and the laser power provided by pump 406 onto a single optical fiber 407. The output of WDM 404 can then be provided to one or more pre-amplifier(s) 408 via optical fiber 407. Pre-amplifier(s) 408 can be optical amplifier(s) that amplify optical signals (e.g., with about 20-30 dB gain). In some embodiments, pre-amplifier(s) 408 are low noise amplifiers. Pre-amplifier(s) 408 output to a combiner 410 via an optical fiber 409. Combiner 410 combines the output laser light of pre-amplifier(s) 408 with the laser power provided by pump 412 via an optical fiber 411. Combiner 410 can combine optical signals having the same wavelength or different wavelengths. One example of a combiner is a WDM. Combiner 410 provides pulses to a booster amplifier 414, which produces output light pulses via optical fiber 410. The booster amplifier 414 provides further amplification of the optical signals. The outputted light pulses can then be transmitted to transmitter 320 and/or steering mechanism 340 (shown in FIG. 3). It is understood that FIG. 4 illustrates one exemplary configuration of fiber-based laser source 400. Laser source 400 can have many other configurations using different combinations of one or more components shown in FIG. 4 and/or other components not shown in FIG. 4 (e.g., other components such as power supplies, lens, filters, splitters, combiners, etc.).

In some variations, fiber-based laser source 400 can be controlled (e.g., by control circuitry 350) to produce pulses of different amplitudes based on the fiber gain profile of the fiber used in fiber-based laser source 400. Communication path 312 couples fiber-based laser source 400 to control circuitry 350 (shown in FIG. 3) so that components of fiber-based laser source 400 can be controlled by or otherwise communicate with control circuitry 350. Alternatively, fiber-based laser source 400 may include its own dedicated controller. Instead of control circuitry 350 communicating directly with components of fiber-based laser source 400, a dedicated controller of fiber-based laser source 400 communicates with control circuitry 350 and controls and/or communicates with the components of fiber-based light source 400. Fiber-based light source 400 can also include other components not shown, such as one or more power connectors, power supplies, and/or power lines.

Referencing FIG. 3, typical operating wavelengths of laser source 310 comprise, for example, about 850 nm, about 905 nm, about 940 nm, about 1064 nm, and about 1550 nm. The upper limit of maximum usable laser power is set by the U.S. FDA (U.S. Food and Drug Administration) regulations. The optical power limit at 1550 nm wavelength is much higher than those of the other aforementioned wavelengths. Further, at 1550 nm, the optical power loss in a fiber is low. There characteristics of the 1550 nm wavelength make it more beneficial for long-range LiDAR applications. The amount of optical power output from laser source 310 can be characterized by its peak power, average power, and the pulse energy. The peak power is the ratio of pulse energy to the width of the pulse (e.g., full width at half maximum or FWHM). Thus, a smaller pulse width can provide a larger peak power for a fixed amount of pulse energy. A pulse width can be in the range of nanosecond or picosecond. The average power is the product of the energy of the pulse and the pulse repetition rate (PRR). As described in more detail below, the PRR represents the frequency of the pulsed laser light. The PRR typically corresponds to the maximum range that a LiDAR system can measure. Laser source 310 can be configured to produce pulses at high PRR to meet the desired number of data points in a point cloud generated by the LiDAR system. Laser source 310 can also be configured to produce pulses at medium or low PRR to meet the desired maximum detection distance. Wall plug efficiency (WPE) is another factor to evaluate the total power consumption, which may be a key indicator in evaluating the laser efficiency. For example, as shown in FIG. 1, multiple LiDAR systems may be attached to a vehicle, which may be an electrical-powered vehicle or a vehicle otherwise having limited fuel or battery power supply. Therefore, high WPE and intelligent ways to use laser power are often among the important considerations when selecting and configuring laser source 310 and/or designing laser delivery systems for vehicle-mounted LiDAR applications.

It is understood that the above descriptions provide non-limiting examples of a laser source 310. Laser source 310 can be configured to include many other types of light sources (e.g., laser diodes, short-cavity fiber lasers, solid-state lasers, and/or tunable external cavity diode lasers) that are configured to generate one or more light signals at various wavelengths. In some examples, light source 310 comprises amplifiers (e.g., pre-amplifiers and/or booster amplifiers), which can be a doped optical fiber amplifier, a solid-state bulk amplifier, and/or a semiconductor optical amplifier. The amplifiers are configured to receive and amplify light signals with desired gains.

With reference back to FIG. 3, LiDAR system 300 further comprises a transmitter 320. Laser source 310 provides laser light (e.g., in the form of a laser beam) to transmitter 320. The laser light provided by laser source 310 can be amplified laser light with a predetermined or controlled wavelength, pulse repetition rate, and/or power level. Transmitter 320 receives the laser light from laser source 310 and transmits the laser light to steering mechanism 340 with low divergence. In some embodiments, transmitter 320 can include, for example, optical components (e.g., lens, fibers, mirrors, etc.) for transmitting laser beams to a field-of-view (FOV) directly or via steering mechanism 340. While FIG. 3 illustrates transmitter 320 and steering mechanism 340 as separate components, they may be combined or integrated as one system in some embodiments. Steering mechanism 340 is described in more detail below.

Laser beams provided by laser source 310 may diverge as they travel to transmitter 320. Therefore, transmitter 320 often comprises a collimating lens configured to collect the diverging laser beams and produce more parallel optical beams with reduced or minimum divergence. The collimated optical beams can then be further directed through various optics such as mirrors and lens. A collimating lens may be, for example, a single plano-convex lens or a lens group. The collimating lens can be configured to achieve any desired properties such as the beam diameter, divergence, numerical aperture, focal length, or the like. A beam propagation ratio or beam quality factor (also referred to as the $M^2$ factor) is used for measurement of laser beam quality. In many LiDAR applications, it is important to have good laser beam quality in the generated transmitting laser beam. The $M^2$ factor represents a degree of variation of a beam from an ideal Gaussian beam. Thus, the $M^2$ factor reflects how well a collimated laser beam can be focused on a small spot, or how well a divergent laser beam can be collimated. Therefore, laser source 310 and/or transmitter 320 can be configured to meet, for example, a scan resolution requirement while maintaining the desired $M^2$ factor.

One or more of the light beams provided by transmitter 320 are scanned by steering mechanism 340 to a FOV. Steering mechanism 340 scans light beams in multiple dimensions (e.g., in both the horizontal and vertical dimension) to facilitate LiDAR system 300 to map the environment by generating a 3D point cloud. Steering mechanism 340 will be described in more detail below. The laser light scanned to an FOV may be scattered or reflected by an object in the FOV. At least a portion of the scattered or reflected light returns to LiDAR system 300. FIG. 3 further illustrates an optical receiver and light detector 330 configured to receive the return light. Optical receiver and light detector 330 comprises an optical receiver that is configured to collect the return light from the FOV. The optical receiver can include optics (e.g., lens, fibers, mirrors, etc.) for receiving, redirecting, focus, amplifying, and/or filtering return light from the FOV. For example, the optical receiver often includes a collection lens (e.g., a single plano-convex lens or a lens group) to collect and/or focus the collected return light onto a light detector.

A light detector detects the return light focused by the optical receiver and generates current and/or voltage signals proportional to the incident intensity of the return light. Based on such current and/or voltage signals, the depth information of the object in the FOV can be derived. One exemplary method for deriving such depth information is based on the direct TOF (time of flight), which is described in more detail below. A light detector may be characterized by its detection sensitivity, quantum efficiency, detector bandwidth, linearity, signal to noise ratio (SNR), overload resistance, interference immunity, etc. Based on the applications, the light detector can be configured or customized to have any desired characteristics. For example, optical receiver and light detector 330 can be configured such that the light detector has a large dynamic range while having a good linearity. The light detector linearity indicates the detector's capability of maintaining linear relationship between input optical signal power and the detector's output. A detector having good linearity can maintain a linear relationship over a large dynamic input optical signal range.

To achieve desired detector characteristics, configurations or customizations can be made to the light detector's structure and/or the detector's material system. Various detector structure can be used for a light detector. For example, a light detector structure can be a PIN based structure, which has a undoped intrinsic semiconductor region (i.e., an "i" region) between a p-type semiconductor and an n-type semiconductor region. Other light detector structures comprise, for example, a APD (avalanche photodiode) based structure, a PMT (photomultiplier tube) based structure, a SiPM (Silicon photomultiplier) based structure, a SPAD (single-photon avalanche diode) base structure, and/or quantum wires. For material systems used in a light detector, Si, InGaAs, and/or Si/Ge based materials can be used. It is understood that many other detector structures and/or material systems can be used in optical receiver and light detector 330.

A light detector (e.g., an APD based detector) may have an internal gain such that the input signal is amplified when generating an output signal. However, noise may also be amplified due to the light detector's internal gain. Common types of noise include signal shot noise, dark current shot noise, thermal noise, and amplifier noise (TIA). In some embodiments, optical receiver and light detector 330 may include a pre-amplifier that is a low noise amplifier (LNA). In some embodiments, the pre-amplifier may also include a TIA-transimpedance amplifier, which converts a current signal to a voltage signal. For a linear detector system, input equivalent noise or noise equivalent power (NEP) measures how sensitive the light detector is to weak signals. Therefore, they can be used as indicators of the overall system performance. For example, the NEP of a light detector specifies the power of the weakest signal that can be detected and therefore it in turn specifies the maximum range of a LiDAR system. It is understood that various light detector optimization techniques can be used to meet the requirement of LiDAR system 300. Such optimization techniques may include selecting different detector structures, materials, and/or implement signal processing techniques (e.g., filtering, noise reduction, amplification, or the like). For example, in addition to or instead of using direct detection of return signals (e.g., by using TOF), coherent detection can also be used for a light detector. Coherent detection allows for detecting amplitude and phase information of the received light by interfering the received light with a local oscillator. Coherent detection can improve detection sensitivity and noise immunity.

FIG. 3 further illustrates that LiDAR system 300 comprises steering mechanism 340. As described above, steering mechanism 340 directs light beams from transmitter 320 to scan an FOV in multiple dimensions. A steering mechanism is referred to as a raster mechanism or a scanning mechanism. Scanning light beams in multiple directions (e.g., in both the horizontal and vertical directions) facilitates a LiDAR system to map the environment by generating an image or a 3D point cloud. A steering mechanism can be based on mechanical scanning and/or solid-state scanning. Mechanical scanning uses rotating mirrors to steer the laser beam or physically rotate the LiDAR transmitter and receiver (collectively referred to as transceiver) to scan the laser beam. Solid-state scanning directs the laser beam to various positions through the FOV without mechanically moving any macroscopic components such as the transceiver. Solid-state scanning mechanisms include, for example, optical phased arrays based steering and flash LiDAR based steering. In some embodiments, because solid-state scanning mechanisms do not physically move macroscopic components, the steering performed by a solid-state scanning mechanism may be referred to as effective steering. A LiDAR system using solid-state scanning may also be referred to as a non-mechanical scanning or simply non-scanning LiDAR system (a flash LiDAR system is an exemplary non-scanning LiDAR system).

Steering mechanism 340 can be used with the transceiver (e.g., transmitter 320 and optical receiver and light detector 330) to scan the FOV for generating an image or a 3D point cloud. As an example, to implement steering mechanism 340, a two-dimensional mechanical scanner can be used with a single-point or several single-point transceivers. A single-point transceiver transmits a single light beam or a small number of light beams (e.g., 2-8 beams) to the steering mechanism. A two-dimensional mechanical steering mechanism comprises, for example, polygon mirror(s), oscillating mirror(s), rotating prism(s), rotating tilt mirror surface(s), or a combination thereof. In some embodiments, steering mechanism 340 may include non-mechanical steering mechanism(s) such as solid-state steering mechanism(s). For example, steering mechanism 340 can be based on tuning wavelength of the laser light combined with refraction effect, and/or based on reconfigurable grating/phase array. In some embodiments, steering mechanism 340 can use a single scanning device to achieve two-dimensional scanning or two devices combined to realize two-dimensional scanning.

As another example, to implement steering mechanism 340, a one-dimensional mechanical scanner can be used with an array or a large number of single-point transceivers. Specifically, the transceiver array can be mounted on a rotating platform to achieve 360-degree horizontal field of view. Alternatively, a static transceiver array can be combined with the one-dimensional mechanical scanner. A one-dimensional mechanical scanner comprises polygon mirror(s), oscillating mirror(s), rotating prism(s), rotating tilt mirror surface(s) for obtaining a forward-looking horizontal field of view. Steering mechanisms using mechanical scanners can provide robustness and reliability in high volume production for automotive applications.

As another example, to implement steering mechanism 340, a two-dimensional transceiver can be used to generate a scan image or a 3D point cloud directly. In some embodiments, a stitching or micro shift method can be used to improve the resolution of the scan image or the field of view being scanned. For example, using a two-dimensional transceiver, signals generated at one direction (e.g., the horizontal direction) and signals generated at the other direction (e.g., the vertical direction) may be integrated, interleaved, and/or matched to generate a higher or full resolution image or 3D point cloud representing the scanned FOV.

Some implementations of steering mechanism 340 comprise one or more optical redirection elements (e.g., mirrors or lens) that steer return light signals (e.g., by rotating, vibrating, or directing) along a receive path to direct the return light signals to optical receiver and light detector 330. The optical redirection elements that direct light signals along the transmitting and receiving paths may be the same components (e.g., shared), separate components (e.g., dedicated), and/or a combination of shared and separate components. This means that in some cases the transmitting and receiving paths are different although they may partially overlap (or in some cases, substantially overlap or coaxially aligned).

With reference still to FIG. 3, LiDAR system 300 further comprises control circuitry 350. Control circuitry 350 can be configured and/or programmed to control various parts of the LiDAR system 300 and/or to perform signal processing. In a typical system, control circuitry 350 can be configured and/or programmed to perform one or more control operations including, for example, controlling laser source 310 to obtain desired laser pulse timing, repetition rate, and power; controlling steering mechanism 340 (e.g., controlling the speed, direction, and/or other parameters) to scan the FOV and maintain pixel registration/alignment; controlling optical receiver and light detector 330 (e.g., controlling the sensitivity, noise reduction, filtering, and/or other parameters) such that it is an optimal state; and monitoring overall system health/status for functional safety.

Control circuitry 350 can also be configured and/or programmed to perform signal processing to the raw data generated by optical receiver and light detector 330 to derive distance and reflectance information, and perform data packaging and communication to vehicle perception and planning system 220 (shown in FIG. 2). For example, control circuitry 350 determines the time it takes from transmitting a light pulse until a corresponding return light pulse is received; determines when a return light pulse is not received for a transmitted light pulse; determines the direction (e.g., horizontal and/or vertical information) for a transmitted/return light pulse; determines the estimated range in a particular direction; and/or determines any other type of data relevant to LiDAR system 300.

LiDAR system 300 can be disposed in a vehicle, which may operate in many different environments including hot or cold weather, rough road conditions that may cause intense vibration, high or low humidifies, dusty areas, etc. Therefore, in some embodiments, optical and/or electronic components of LiDAR system 300 (e.g., optics in transmitter 320, optical receiver and light detector 330, and steering mechanism 340) are disposed or configured in such a manner to maintain long term mechanical and optical stability. For example, components in LiDAR system 300 may be secured and sealed such that they can operate under all conditions a vehicle may encounter. As an example, an anti-moisture coating and/or hermetic sealing may be applied to optical components of transmitter 320, optical receiver and light detector 330, and steering mechanism 340 (and other components that are susceptible to moisture). As another example, housing(s), enclosure(s), and/or window can be used in LiDAR system 300 for providing desired characteristics such as hardness, ingress protection (IP) rating, self-cleaning capability, resistance to chemical and resistance to impact, or the like. In addition, efficient and economical methodologies for assembling LiDAR system 300 may be used to meet the LiDAR operating requirements while keeping the cost low.

It is understood by a person of ordinary skill in the art that FIG. 3 and the above descriptions are for illustrative purposes only, and a LiDAR system can include other functional units, blocks, or segments, and can include variations or combinations of these above functional units, blocks, or segments. For example, LiDAR system 300 can also include other components not depicted in FIG. 3, such as power buses, power supplies, LED indicators, switches, etc. Additionally, other connections among components may be present, such as a direct connection between light source 310 and optical receiver and light detector 330 so that light detector 330 can accurately measure the time from when light source 310 transmits a light pulse until light detector 330 detects a return light pulse.

These components shown in FIG. 3 are coupled together using communications paths 312, 314, 322, 332, 342, 352, and 362. These communications paths represent communication (bidirectional or unidirectional) among the various LiDAR system components but need not be physical components themselves. While the communications paths can be implemented by one or more electrical wires, busses, or optical fibers, the communication paths can also be wireless channels or open-air optical paths so that no physical communication medium is present. For example, in one exemplary LiDAR system, communication path 314 includes one or more optical fibers; communication path 352 represents an optical path; and communication paths 312, 322, 342, and 362 are all electrical wires that carry electrical signals. The communication paths can also include more than one of the above types of communication mediums (e.g., they can include an optical fiber and an optical path, or one or more optical fibers and one or more electrical wires).

Figure 5A:
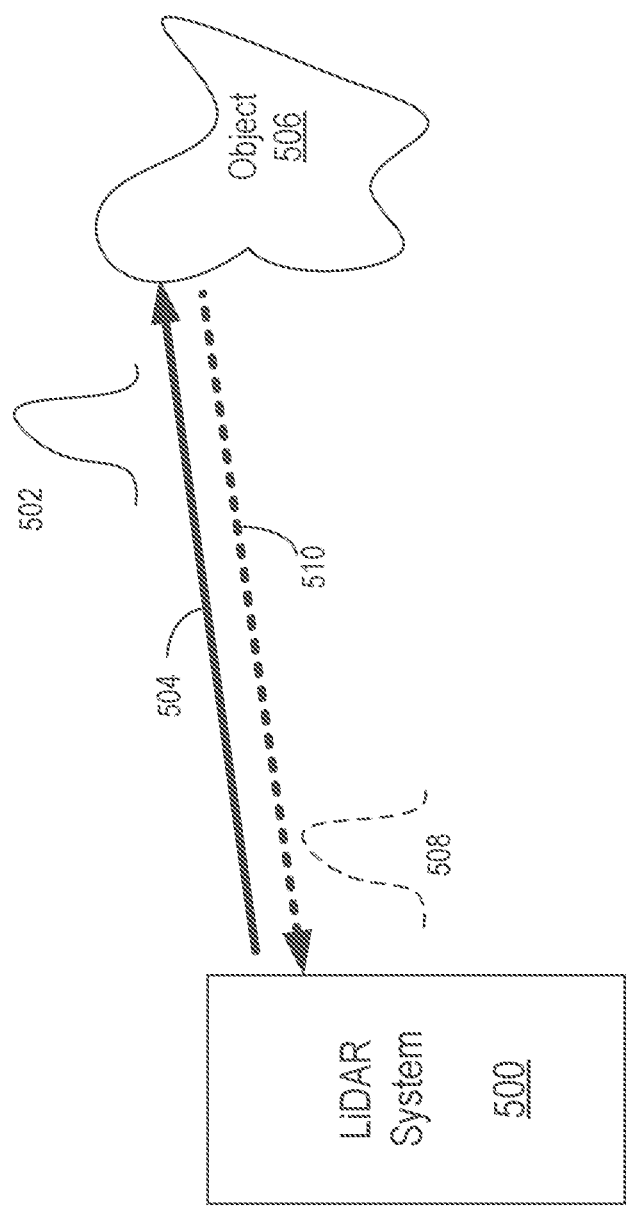
FIGS. 5A-5C illustrate an exemplary LiDAR system using pulse signals to measure distances to objects disposed in a field-of-view (FOV).

As described above, some LiDAR systems use the time-of-flight (TOF) of light signals (e.g., light pulses) to determine the distance to objects in a light path. For example, with reference to FIG. 5A, an exemplary LiDAR system 500 includes a laser light source (e.g., a fiber laser), a steering system (e.g., a system of one or more moving mirrors), and a light detector (e.g., a photon detector with one or more optics). LiDAR system 500 can be implemented using, for example, LiDAR system 300 described above. LiDAR system 500 transmits a light pulse 502 along light path 504 as determined by the steering system of LiDAR system 500. In the depicted example, light pulse 502, which is generated by the laser light source, is a short pulse of laser light. Further, the signal steering system of the LiDAR system 500 is a pulsed-signal steering system. However, it should be appreciated that LiDAR systems can operate by generating, transmitting, and detecting light signals that are not pulsed and derive ranges to an object in the surrounding environment using techniques other than time-of-flight. For example, some LiDAR systems use frequency modulated continuous waves (i.e., "FMCW"). It should be further appreciated that any of the techniques described herein with respect to time-of-flight based systems that use pulsed signals also may be applicable to LiDAR systems that do not use one or both of these techniques.

Referring back to FIG. 5A (e.g., illustrating a time-of-flight LiDAR system that uses light pulses), when light pulse 502 reaches object 506, light pulse 502 scatters or reflects to generate a return light pulse 508. Return light pulse 508 may return to system 500 along light path 510. The time from when transmitted light pulse 502 leaves LiDAR system 500 to when return light pulse 508 arrives back at LiDAR system 500 can be measured (e.g., by a processor or other electronics, such as control circuitry 350, within the LiDAR system). This time-of-flight combined with the knowledge of the speed of light can be used to determine the range/distance from LiDAR system 500 to the portion of object 506 where light pulse 502 scattered or reflected.

Figure 5B:
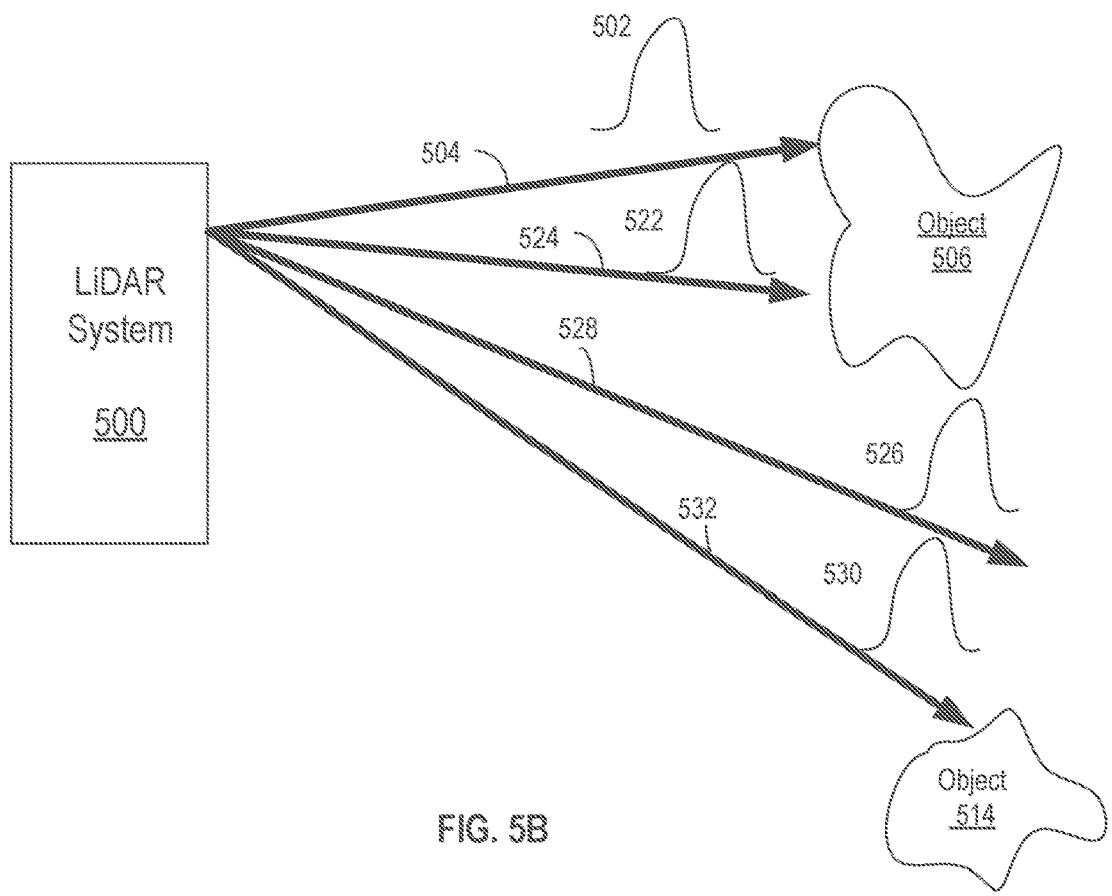
Figure 5C:
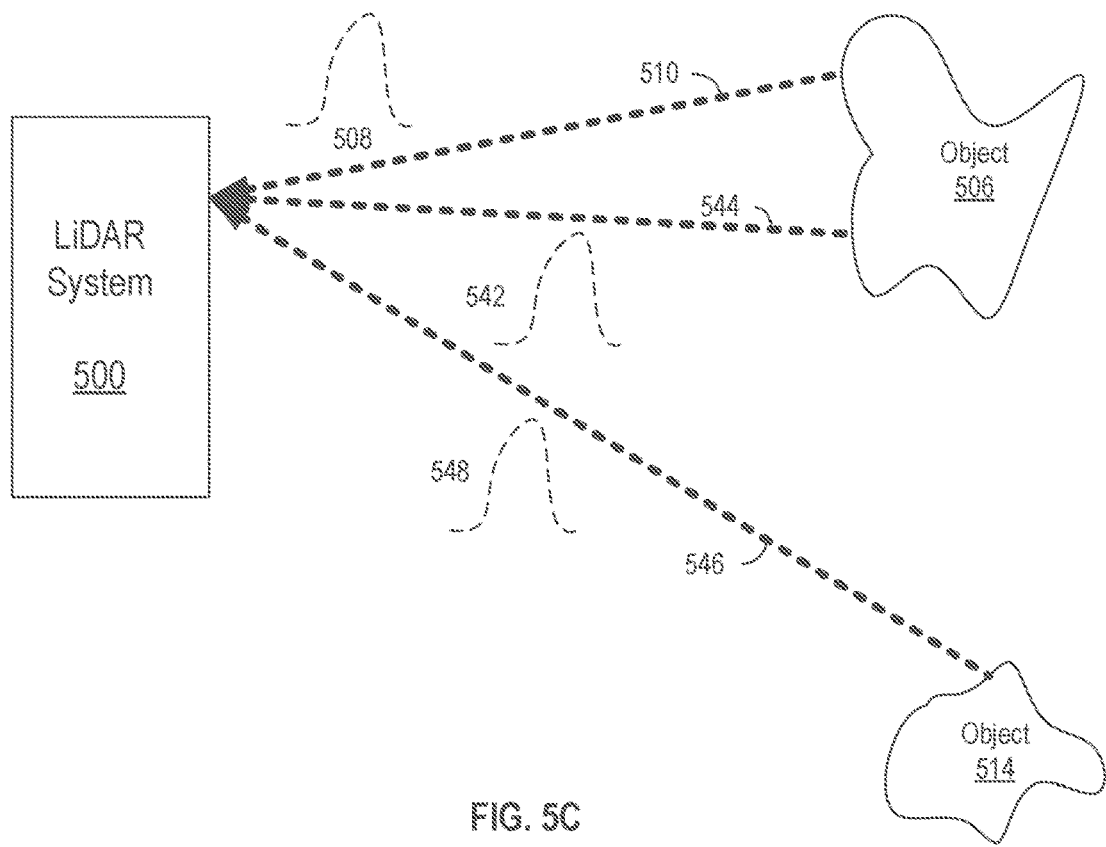

By directing many light pulses, as depicted in FIG. 5B, LiDAR system 500 scans the external environment (e.g., by directing light pulses 502, 522, 526, 530 along light paths 504, 524, 528, 532, respectively). As depicted in FIG. 5C, LiDAR system 500 receives return light pulses 508, 542, 548 (which correspond to transmitted light pulses 502, 522, 530, respectively). Return light pulses 508, 542, and 548 are generated by scattering or reflecting the transmitted light pulses by one of objects 506 and 514. Return light pulses 508, 542, and 548 may return to LiDAR system 500 along light paths 510, 544, and 546, respectively. Based on the direction of the transmitted light pulses (as determined by LiDAR system 500) as well as the calculated range from LiDAR system 500 to the portion of objects that scatter or reflect the light pulses (e.g., the portions of objects 506 and 514), the external environment within the detectable range (e.g., the field of view between path 504 and 532, inclusively) can be precisely mapped or plotted (e.g., by generating a 3D point cloud or images).

If a corresponding light pulse is not received for a particular transmitted light pulse, then it may be determined that there are no objects within a detectable range of LiDAR system 500 (e.g., an object is beyond the maximum scanning distance of LiDAR system 500). For example, in FIG. 5B, light pulse 526 may not have a corresponding return light pulse (as illustrated in FIG. 5C) because light pulse 526 may not produce a scattering event along its transmission path 528 within the predetermined detection range. LiDAR system 500, or an external system in communication with LiDAR system 500 (e.g., a cloud system or service), can interpret the lack of return light pulse as no object being disposed along light path 528 within the detectable range of LiDAR system 500.

In FIG. 5B, light pulses 502, 522, 526, and 530 can be transmitted in any order, serially, in parallel, or based on other timings with respect to each other. Additionally, while FIG. 5B depicts transmitted light pulses as being directed in one dimension or one plane (e.g., the plane of the paper), LiDAR system 500 can also direct transmitted light pulses along other dimension(s) or plane(s). For example, LiDAR system 500 can also direct transmitted light pulses in a dimension or plane that is perpendicular to the dimension or plane shown in FIG. 5B, thereby forming a 2-dimensional transmission of the light pulses. This 2-dimensional transmission of the light pulses can be point-by-point, line-by-line, all at once, or in some other manner. A point cloud or image from a 1-dimensional transmission of light pulses (e.g., a single horizontal line) can generate 2-dimensional data (e.g., (1) data from the horizontal transmission direction and (2) the range or distance to objects). Similarly, a point cloud or image from a 2-dimensional transmission of light pulses can generate 3-dimensional data (e.g., (1) data from the horizontal transmission direction, (2) data from the vertical transmission direction, and (3) the range or distance to objects). In general, a LiDAR system performing an n-dimensional transmission of light pulses generates (n+1) dimensional data. This is because the LiDAR system can measure the depth of an object or the range/distance to the object, which provides the extra dimension of data. Therefore, a 2D scanning by a LiDAR system can generate a 3D point cloud for mapping the external environment of the LiDAR system.

The density of a point cloud refers to the number of measurements (data points) per area performed by the LiDAR system. A point cloud density relates to the LiDAR scanning resolution. Typically, a larger point cloud density, and therefore a higher resolution, is desired at least for the region of interest (ROI). The density of points in a point cloud or image generated by a LiDAR system is equal to the number of pulses divided by the field of view. In some embodiments, the field of view can be fixed. Therefore, to increase the density of points generated by one set of transmission-receiving optics (or transceiver optics), the LiDAR system may need to generate a pulse more frequently. In other words, a light source with a higher pulse repetition rate (PRR) is needed. On the other hand, by generating and transmitting pulses more frequently, the farthest distance that the LiDAR system can detect may be limited. For example, if a return signal from a distant object is received after the system transmits the next pulse, the return signals may be detected in a different order than the order in which the corresponding signals are transmitted, thereby causing ambiguity if the system cannot correctly correlate the return signals with the transmitted signals.

To illustrate, consider an exemplary LiDAR system that can transmit laser pulses with a repetition rate between 500 kHz and 1 MHz. Based on the time it takes for a pulse to return to the LiDAR system and to avoid mix-up of return pulses from consecutive pulses in a conventional LiDAR design, the farthest distance the LiDAR system can detect may be 300 meters and 150 meters for 500 kHz and 1 MHz, respectively. The density of points of a LiDAR system with 500 kHz repetition rate is half of that with 1 MHz. Thus, this example demonstrates that, if the system cannot correctly correlate return signals that arrive out of order, increasing the repetition rate from 500 kHz to 1 MHz (and thus improving the density of points of the system) may reduce the detection range of the system. Various techniques are used to mitigate the tradeoff between higher PRR and limited detection range. For example, multiple wavelengths can be used for detecting objects in different ranges. Optical and/or signal processing techniques are also used to correlate between transmitted and return light signals.

Various systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Various systems, apparatus, and methods described herein may be implemented using computers operating in a client-server relationship. Typically, in such a system, the client computers are located remotely from the server computers and interact via a network. The client-server relationship may be defined and controlled by computer programs running on the respective client and server computers. Examples of client computers can include desktop computers, workstations, portable computers, cellular smartphones, tablets, or other types of computing devices.

Figure 13:
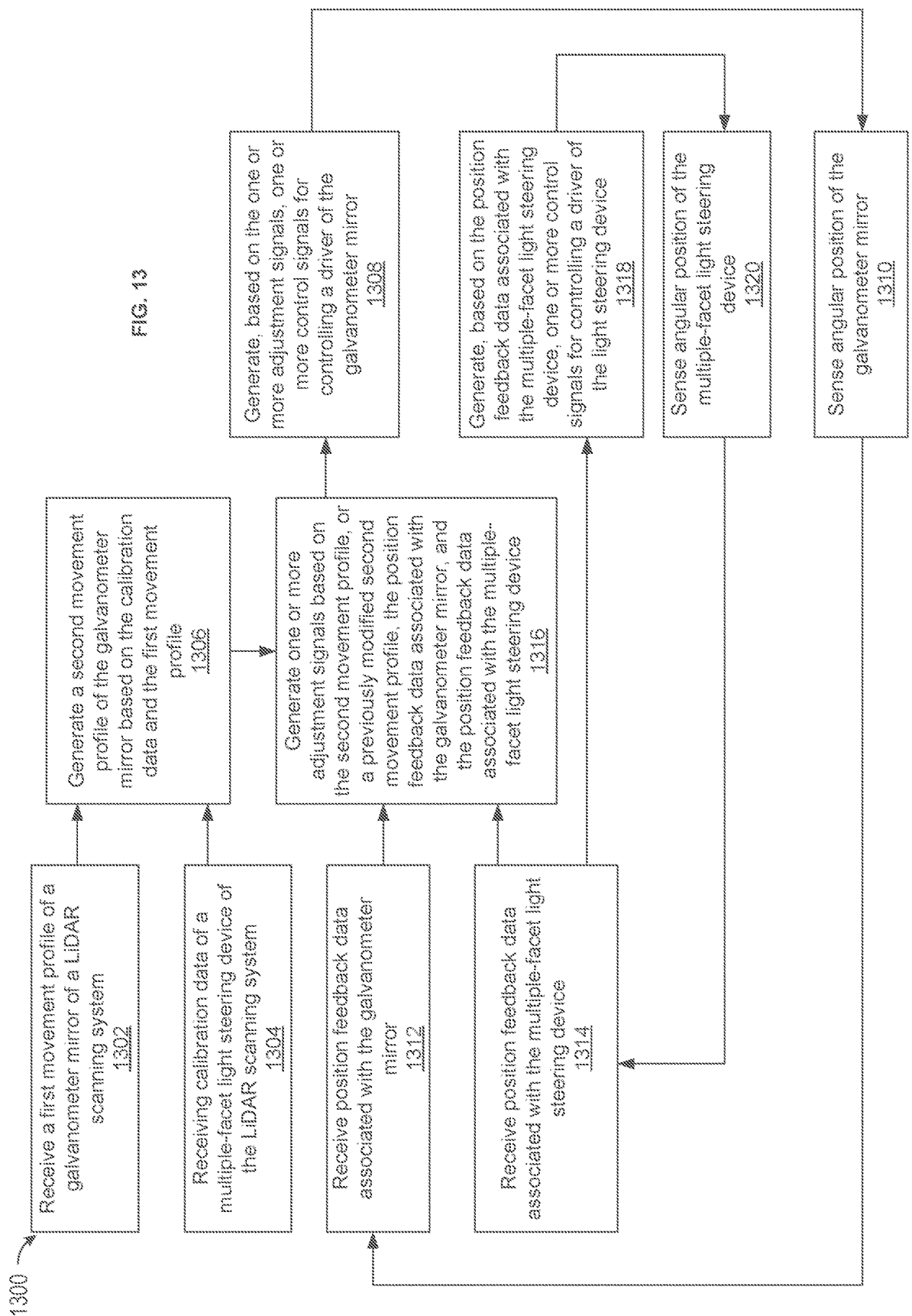
FIG. 13 is a flowchart illustrating a method for controlling a LiDAR scanning system.

Various systems, apparatus, and methods described herein may be implemented using a computer program product tangibly embodied in an information carrier, e.g., in a non-transitory machine-readable storage device, for execution by a programmable processor; and the method processes and steps described herein, including one or more of the steps of FIG. 13, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 6:
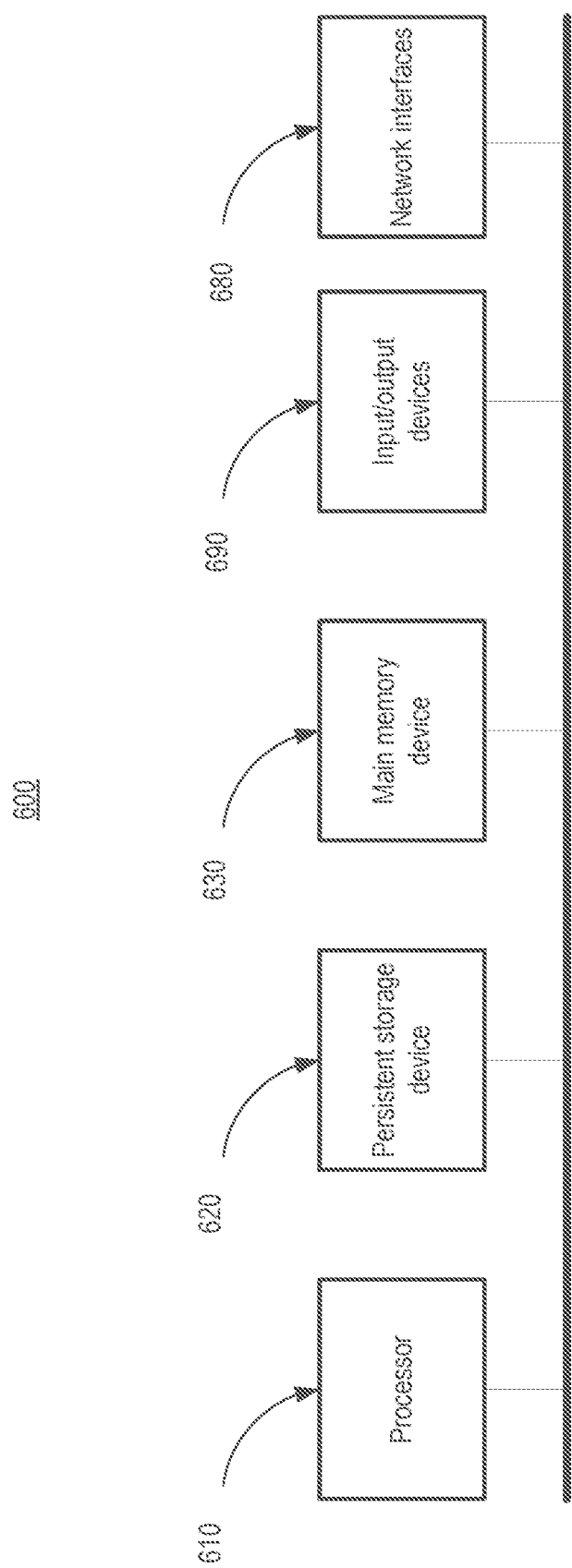
FIG. 6 is a block diagram illustrating an exemplary apparatus used to implement systems, apparatus, and methods in various embodiments.

A high-level block diagram of an exemplary apparatus that may be used to implement systems, apparatus and methods described herein is illustrated in FIG. 6. Apparatus 600 comprises a processor 610 operatively coupled to a persistent storage device 620 and a main memory device 630. Processor 610 controls the overall operation of apparatus 600 by executing computer program instructions that define such operations. The computer program instructions may be stored in persistent storage device 620, or other computer-readable medium, and loaded into main memory device 630 when execution of the computer program instructions is desired. For example, processor 610 may be used to implement one or more components and systems described herein, such as control circuitry 350 (shown in FIG. 3), vehicle perception and planning system 220 (shown in FIG. 2), and vehicle control system 280 (shown in FIG. 2). Thus, one or more of the method steps of FIG. 13 can be defined by the computer program instructions stored in main memory device 630 and/or persistent storage device 620 and controlled by processor 610 executing the computer program instructions. For example, the computer program instructions can be implemented as computer executable code programmed by one skilled in the art to perform an algorithm defined by the method steps of FIG. 13. Accordingly, by executing the computer program instructions, the processor 610 executes an algorithm defined by one or more steps of the methods of FIGS. 3-5 and 13. Apparatus 600 also includes one or more network interfaces 680 for communicating with other devices via a network. Apparatus 600 may also include one or more input/output devices 690 that enable user interaction with apparatus 600 (e.g., display, keyboard, mouse, speakers, buttons, etc.).

Processor 610 may include both general and special purpose microprocessors and may be the sole processor or one of multiple processors of apparatus 600. Processor 610 may comprise one or more central processing units (CPUs), and one or more graphics processing units (GPUs), which, for example, may work separately from and/or multi-task with one or more CPUs to accelerate processing, e.g., for various image processing applications described herein. Processor 610, persistent storage device 620, and/or main memory device 630 may include, be supplemented by, or incorporated in, one or more application-specific integrated circuits (ASICs) and/or one or more field programmable gate arrays (FPGAs).

Persistent storage device 620 and main memory device 630 each comprise a tangible non-transitory computer readable storage medium. Persistent storage device 620, and main memory device 630, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 690 may include peripherals, such as a printer, scanner, display screen, etc. For example, input/output devices 690 may include a display device such as a cathode ray tube (CRT), plasma or liquid crystal display (LCD) monitor for displaying information to a user, a keyboard, and a pointing device such as a mouse or a trackball by which the user can provide input to apparatus 600.

Any or all of the functions of the systems and apparatuses discussed herein may be performed by processor 610, and/or incorporated in, an apparatus or a system such as LiDAR system 300. Further, LiDAR system 300 and/or apparatus 600 may utilize one or more neural networks or other deep-learning techniques performed by processor 610 or other systems or apparatuses discussed herein.

One skilled in the art will recognize that an implementation of an actual computer or computer system may have other structures and may contain other components as well, and that FIG. 6 is a high-level representation of some of the components of such a computer for illustrative purposes.

Figure 7A:
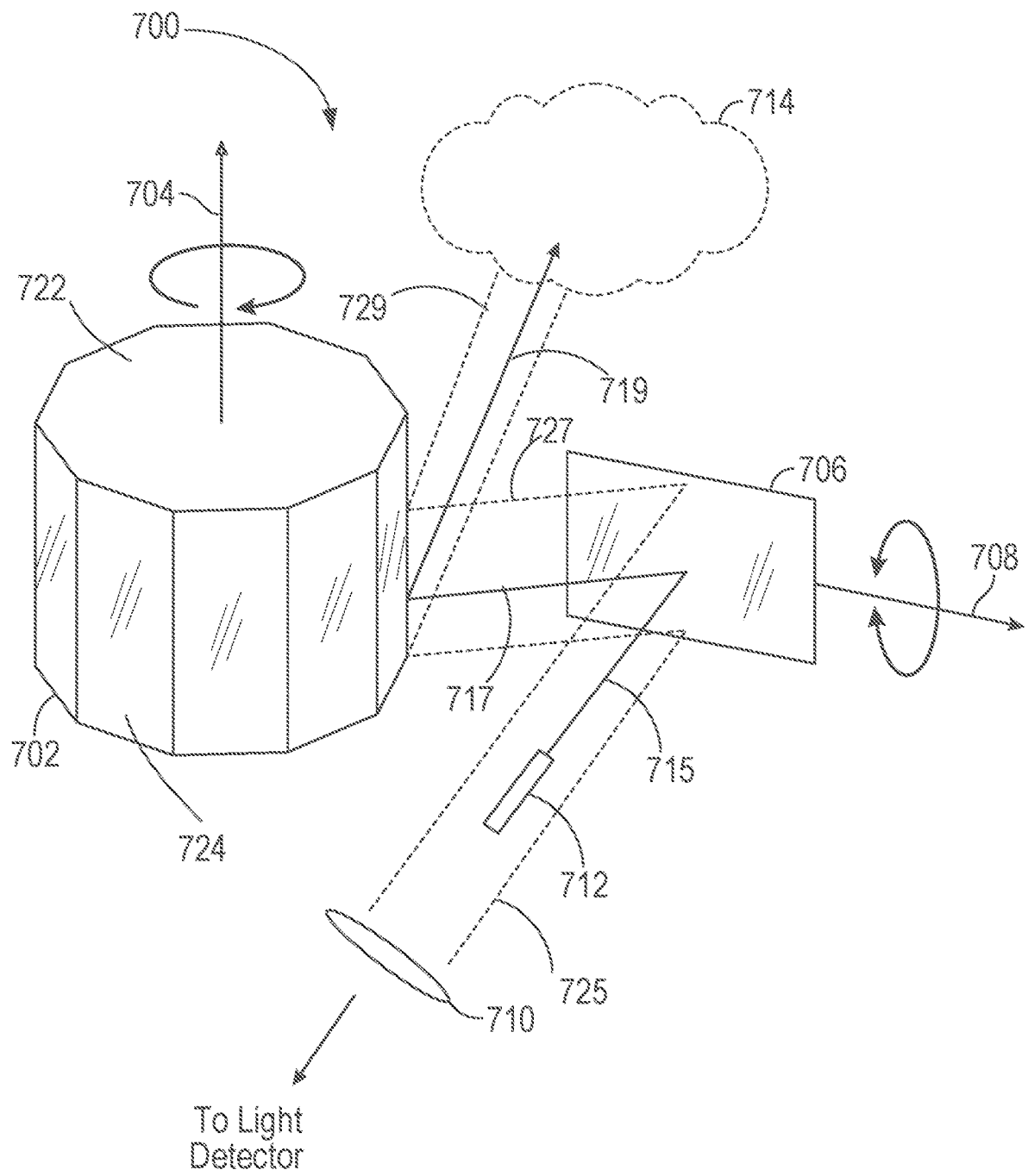
FIG. 7A illustrates a simplified LiDAR scanning system having a multiple-facet light steering device and a Galvanometer mirror according to some embodiments.

FIG. 7A illustrates a simplified LiDAR system 700 having a multiple-facet light steering device 702 and a Galvanometer mirror 706 according to some embodiments. As shown in FIG. 7A, in addition to device 702 and mirror 706, system 700 can also comprise a transmitter 712 and a collection lens 710. Transmitter 712 includes a laser source that can provide one or more transmission laser beams 715. Transmission laser beams 715 are directed to mirror 706. Mirror 706 is controlled to oscillate about an axis 708 between two predefined angular positions. The oscillation of the mirror 706 facilitates scanning light along one dimension (e.g., the vertical dimension) of a FOV. Mirror 706 reflects transmission laser beams 715 to form transmission light beams 717, which are directed toward multiple-facet light steering device 702.

In some embodiments, multiple-facet light steering device 702 comprises a top surface 722, a bottom surface (not shown), and multiple facets 724 that reflect light. A side surface 724 is disposed between the top and bottom surfaces of device 702 and is sometimes also referred to as a facet. One embodiment of the multiple-facet light steering device 702 is shown in FIG. 7A, where the device has a polygon-shaped top and bottom surfaces (e.g., pentagon-shaped, hexagon shaped, octagon-shaped, or the like) and multiple rectangle-shaped facets 724. In some embodiments, facets 724 are reflective surfaces (e.g., mirrors) and thus multiple-facet light steering device can be a polygon mirror. As shown in FIG. 7A, facets 724 reflect transmission light beams 717 to form transmission light beams 719, which illuminate objects in a FOV 714. Light steering device 702 is configured to rotate about an axis 704. Therefore, each facet of light steering device 702 take turns to reflect light. In the present disclosure, oscillation means continuously moving back and forth in two opposite directions (e.g., clockwise and counterclockwise) within a predetermined angular range (e.g., 40 degrees, 80 degrees, etc. degrees) in a periodical or non-periodical manner. Rotation means continuously moving in only one direction for at least 360 degrees.

In some embodiments, at any particular time, multiple transmission light beams 717 are reflected by a same facet of light steering device 702 to form multiple transmission light beams 719. In some embodiments, multiple transmission light beams 717 are reflected by different facets of steering device 702. Regardless of whether single or multiple facets are used for reflecting transmission light beams, the uniformity of the facets may affect various aspects of the light redirection capabilities of light steering device 702. For example, the non-uniformity differences among facets of light steering device 702 may affect the reflection angles of the transmission light beams 719, which in turn may affect the shape of the scanlines in the resulting LiDAR scanning pattern. The non-uniformity differences and their effect on the scanlines are described in greater detail below.

When transmission light beams 719 travel to illuminate one or more objects in FOV 714, at least a portion of transmission light beams 719 is reflected or scattered to form return light 729. Return light 729 is redirected (e.g., reflected) by light steering device 702 to form return light 727, which is directed toward mirror 706. Return light 727 is redirected (e.g., reflected) by mirror 706 to form return light 725, which is collected by collection lens 710. Collection lens 710 directs the collected return light to other components of the LiDAR system 700 (e.g., a light detector). Thus, in some embodiments, light steering device 702 and mirror 706 are used for both transmitting light beams to illuminate objects in an FOV and to receive and redirect return light to a receiver of the LiDAR system 700.

In some embodiments, return light 729 is formed from multiple transmission light beams 719 and is reflected by a same facet of light steering device 702 at any particular time. In some embodiments, return light 729 is reflected by different facets of light steering device 702. Regardless of whether single or multiple facets are used, the uniformity of the facets of light steering device 702 affect the device's capabilities of receiving and redirection of the return light. For example, the non-uniformity differences between facets of light steering device 702 may affect the angles of the redirected return light, which in turn may affect the shape of the scanlines in the resulting LiDAR scanning pattern.

The LiDAR system 700 and steering device 702 shown in FIG. 7A are described in more detail in U.S. non-provisional patent application Ser. No. 16/682,774, filed on Nov. 14, 2018, entitled "LIDAR SYSTEMS THAT USE A MULTI-FACET MIRROR", the content of which is incorporated by reference in it is entirety for all purposes.

Figure 7B:
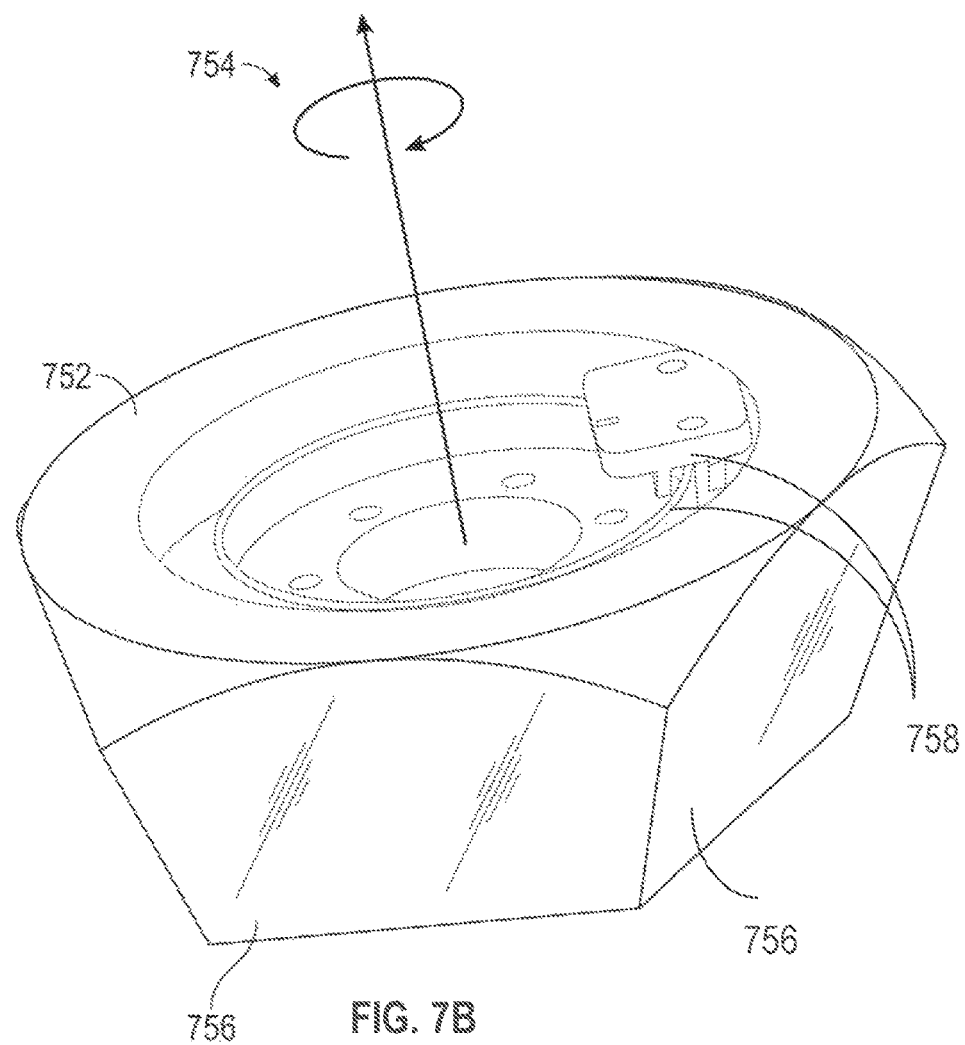
FIG. 7B illustrates another example of a multiple-facet light steering device according to some embodiments.
Figure 7C:
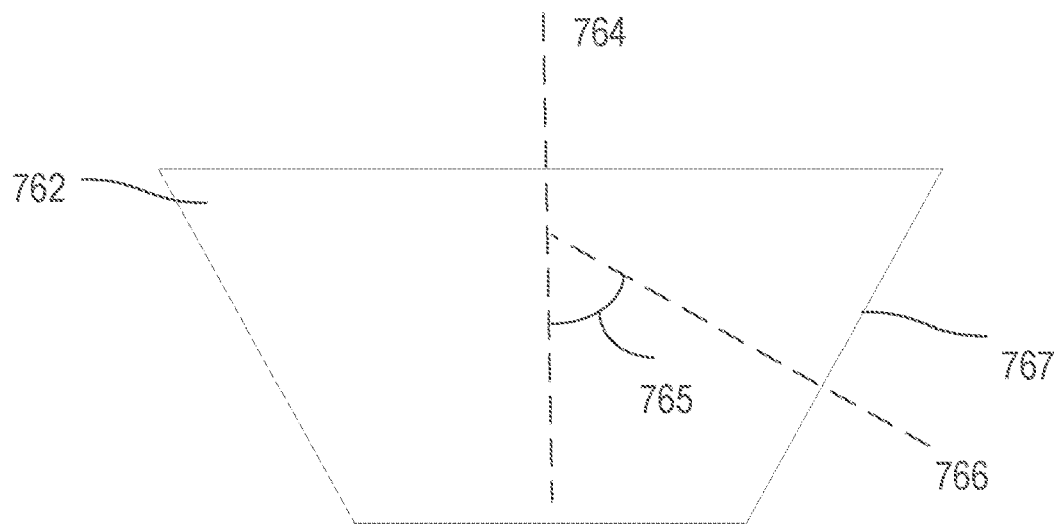
FIG. 7C is a side view of an example multiple-facet light steering device according to some embodiments.

In some embodiments, facets 724 of light steering device 702 shown in FIG. 7A have 90-degree tile angles. A tilt angle is an angle between the normal direction of a facet and the rotational axis of the multiple-facet light steering device. Therefore, for a facet of device 702, the tilt angle is between the direction perpendicular to a facet and axis 704. The tilt angle of a facet 724 is thus 90 degrees in the embodiment shown in FIG. 7A. In some embodiments, the tilt angle may not be 90 degrees. FIG. 7B illustrates such a multiple-facet light steering device 752. Light steering device 752 can be a polygon mirror having multiple facets 756 (two are shown in FIG. 7B). Steering device 752 can rotate about an axis 754. Each facet 756 of steering device 752 has a tilt angle that is not 90-degrees, thereby forming wedged facets. Therefore, a cross-section of the light steering device may have a trapezoidal shape. FIG. 7C illustrates a cross-sectional view of a multiple-facet light steering device 762.

Similar to device 752, facets of light steering device 762 have non-90 degree tilt angles. As shown in FIG. 7C, one such tilt angle 765 is illustrated as being an angle between rotational axis 764 and the normal direction 766 of facet 767. Multiple-facet light steering device 764 can rotate about its rotational axis 764. Light steering devices having non-90 degree tilt angles are described in more detail in U.S. non-provisional patent application Ser. No. 16/242,567, filed on Jan. 8, 2019, entitled "LIDAR DETECTION SYSTEMS AND METHODS THAT USE MULTI-PLANE MIRRORS", the content of which is incorporated by reference in its entirety for all purposes.

FIG. 7B further illustrates a position encoder 758 configured to detect the angular positions of light steering device 764. Position encoder 758 can be, for example, a rotatory encoder (shown in FIG. 7B) and/or a Hall effect sensor. As described below in more detail, the position encoder can provide real time position feedback data of a light steering device for further modifying a movement profile of the Galvanometer mirror to compensate for position inaccuracies during operation. A similar position encoder can provide real time position feedback data of a Galvanometer mirror for similar purposes.

Figure 8:
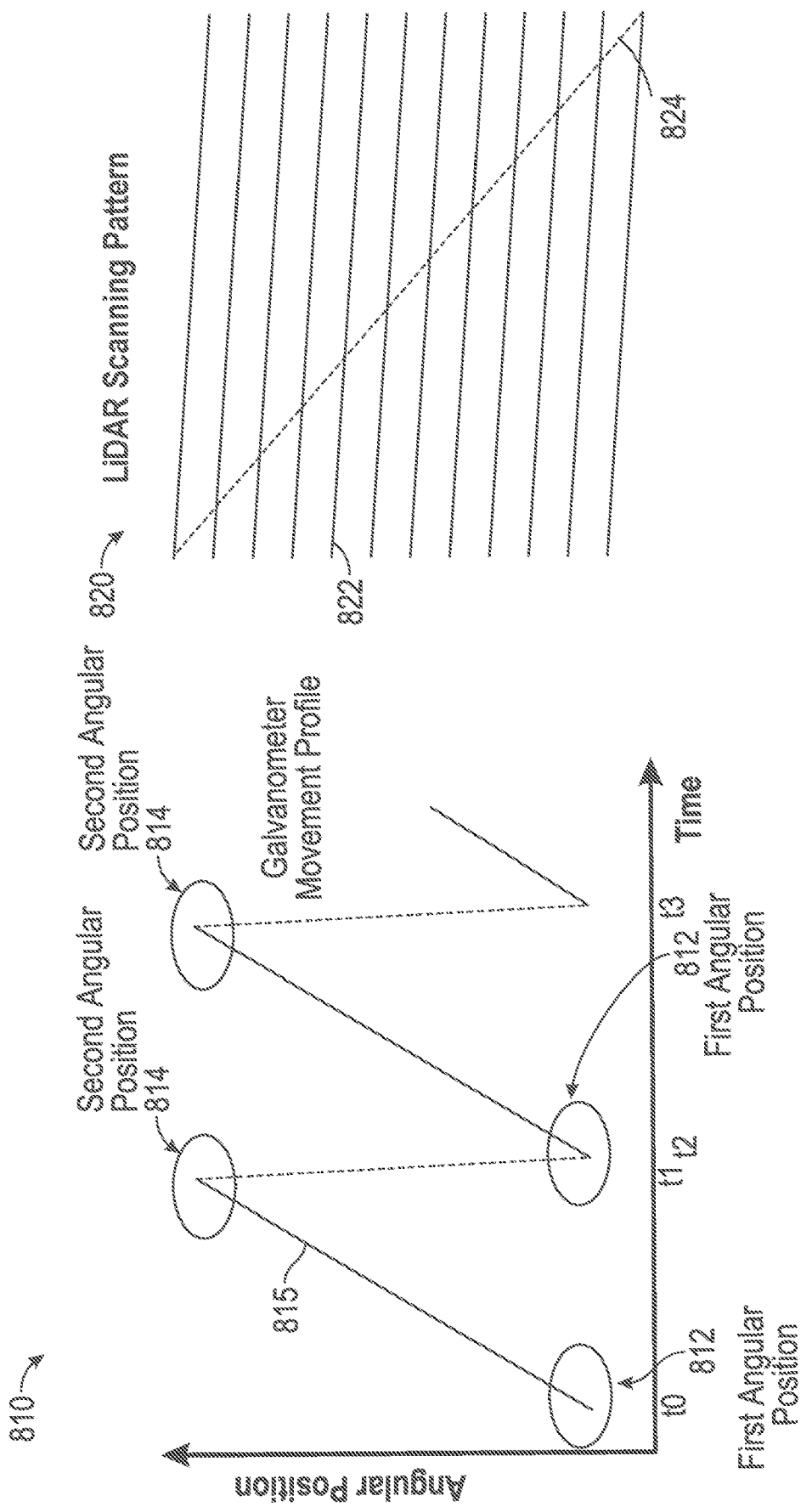
FIG. 8 illustrates an example movement profile of a Galvanometer mirror and a corresponding LiDAR scanning pattern according to some embodiments.

FIG. 8 illustrates an example movement profile 810 of a Galvanometer mirror and a corresponding LiDAR scanning pattern 820 according to some embodiments. The Galvanometer mirror can be, for example, mirror 706 shown in FIG. 7A. As described above, a Galvanometer mirror (e.g., mirror 706) can be configured to oscillate between two angular positions (e.g., −20 degrees to +20 degrees) to facilitate scanning light in one dimension (e.g., the vertical dimension) of an FOV. The movement profile 810 includes an example trajectory 815 of a Galvanometer mirror's movement. Trajectory 815 illustrates an angular position and time relation of the Galvanometer mirror. An angular position of the Galvanometer mirror can be pre-determined at any particular time position. The Galvanometer mirror can be controlled to move to the particular angular positions at respective particular time positions. For example, at time position t0, the mirror is at first angular position 812. The angular positions of the mirror change with respect to time until the mirror moves to second angular position 814. In some embodiments, the angular position changes in a linear manner with respect to the time. The first and second angular positions can be end positions of oscillation. Thus, when the Galvanometer mirror moves to one of the first or second angular positions, the mirror changes to move in the opposite direction. As such, at time position t1, the mirror moves to second angular position 814 and then changes its oscillation direction. At time t2, the Galvanometer mirror moves back to first angular position 812, and then changes the oscillation direction again. The movement of the mirror then repeats as shown in the movement profile 810 of FIG. 8. In one embodiment, movement profile 810 includes a sawtooth-shaped trajectory as shown in FIG. 8. The Galvanometer mirror can be configured to oscillate according to a movement profile periodically or in any desired manner. It is understood that movement profile 810 may have other shapes such as a symmetric triangular wave.

As described above, the oscillation of a Galvanometer mirror facilitates scanning of transmission light beams in one dimension (e.g., the vertical dimension) of the FOV. A multiple-facet light steering device (e.g., a polygon mirror) rotates to facilitate the scanning of the transmission light beams in another dimension (e.g., the horizontal dimension) of the FOV. The resulting LiDAR scanning pattern can be, for example, pattern 820 shown in FIG. 8. Pattern 820 has multiple scanlines 822 distributed from top to bottom. Scanlines 822 are formed by the simultaneous movements of the multiple-facet light steering device and the Galvanometer mirror. When the Galvanometer mirror oscillates to one of its two end angular positions (e.g., second angular position 814), it retraces back or fly back to the other end angular position (e.g., first angular position 812). The retrace is indicated by retrace line 824 in pattern 820. Therefore, during the time the Galvanometer mirror moves from first angular position 812 to second angular position 814 in one single trip (e.g., from time t0 to t1), the multiple-facet light steering device (e.g., a polygon mirror) rotates multiple rounds to generate a plurality of scanlines (e.g., by using one or more transmission beams). Each facet of the light steering device facilitates generating of a part of the scanlines. Moreover, because the multiple-facets light steering device and the Galvanometer mirror move at the same time (e.g., the light steering device is rotating while the Galvanometer mirror is oscillating), the scanlines in pattern 820 generally have a non-zero slope (e.g., the scanlines are tilted downward from left to right). In other words, the left end and the right end of a scanline in pattern 820 may not be the same in the vertical dimension. The slope of the scanline reflects the movement of the Galvanometer mirror to scan light in the vertical dimension while the light steering device rotates to produce the scanlines from left to right.

If all facets of the steering device are identical without any non-uniformity differences and if the assembly process is performed perfectly (e.g., the motor axle does not have any movement in the radial direction), then the scanlines in LiDAR scanning pattern 820 should be straight lines as shown in FIG. 8. That is, the scanlines should have no deformation or deviation from their straight line shape.

Figure 9:
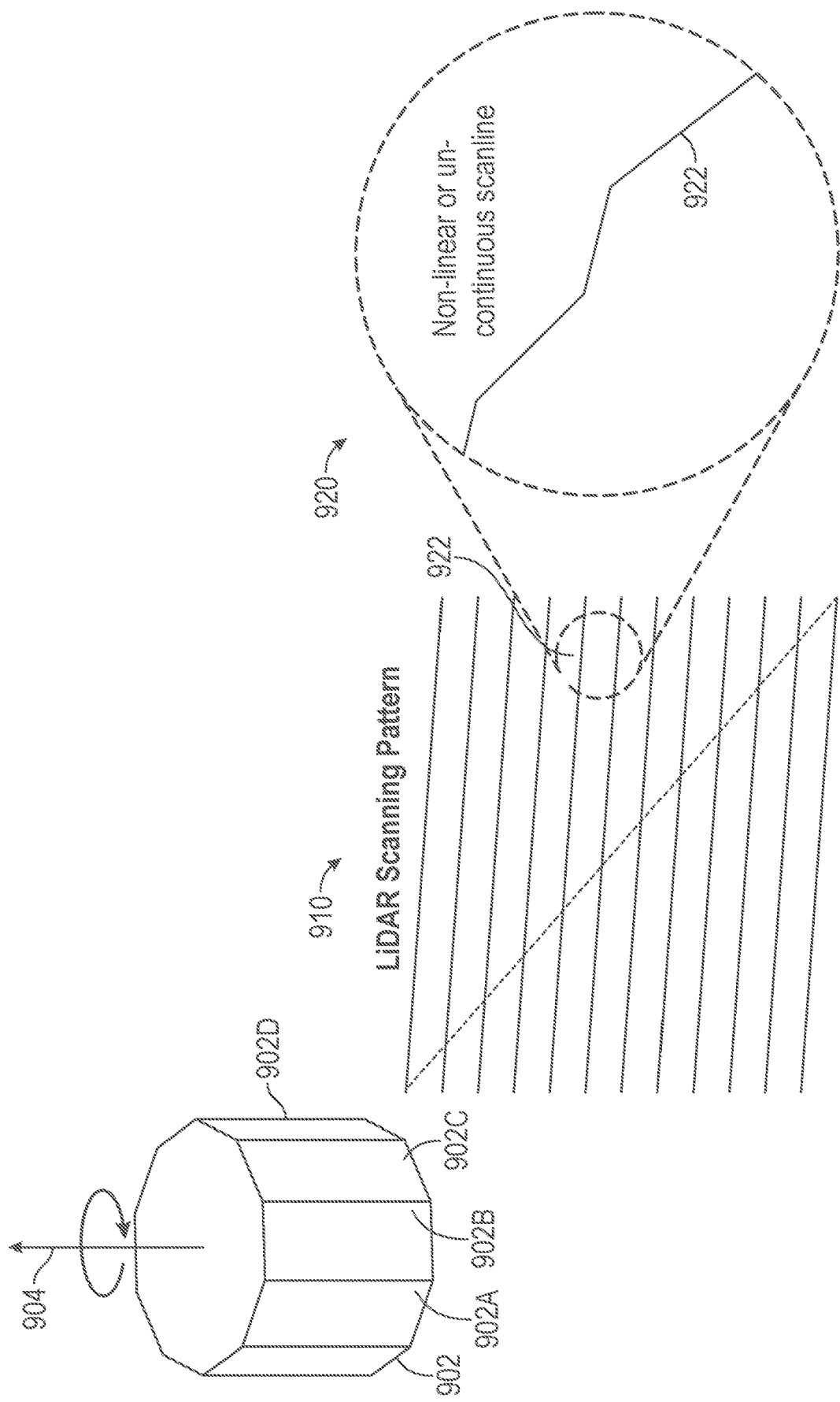
FIG. 9 illustrates an example LiDAR scanning pattern with a zoom-in view of a portion of the pattern according to some embodiments.

In mass production, however, not all facets of the same steering device are produced identical to each other, and the assembly process is not always perfect. As a result, non-uniformity across multiple facets may occur for a particular light steering device. FIG. 9 illustrates a multiple facets steering device 902, which comprises facets 902A-D for reflecting or redirecting light. One or more of facets 902A-D may be manufactured in such a way that they are different and/or non-uniform with respect to one another. For example, one or more of facets 902A-D may have facet angular uniformity differences. A facet angle is sometimes also referred to as the tilt angle of the facet. Thus, the facet angle is the angle between the normal direction of a facet (e.g., the direction perpendicular to the facet surface) and the rotational axis of the steering device (e.g., axis 904). Different facets ideally should have the same desired facet angles (e.g., all angles are 45 degrees or all angles are 90 degrees). However, due to the mass production process, the facet angles may vary from facet to facet. Therefore, there may have facet angular uniformity differences (e.g., facet angle of facet 902A may be 89.5 degrees, facet angle of facet 902B may be 90 degrees, facet angle of facet 902C may be 91 degrees, or the like).

In some embodiment, one or more of facets 902A-D may have facet dimension uniformity differences. For example, ideally, all facets of a steering device should have the same dimension (width, length, facet inner angles, or the like). However, due to manufacturing errors and inaccuracies, multiple facets may have different dimensions (e.g., longer width and/or length of facet 902A than those of facet 902D, inner angle differences between facets 902B and 902C, or the like).

In some embodiments, one or more of facets 902A-D may have surface form error differences. A surface form error, sometimes also referred to as a surface error or a surface figure error, is the deviation of the optical surface from its ideal or perfect form. For a reflecting surface (e.g., the surface of a facet of the steering device), surface form error includes one or more of a conic error, a radius of curvature error, zonal errors, a turned edge, asymmetric local surface deviations, etc. They are usually caused by manufacturing or machining tolerances. Different facets 902A-D may thus have different surface forms. For instance, facet 902B may have a slightly more curvature (e.g., more convex or concave) than facet 902C. Therefore, the direction of the light reflected or redirected by facet 902B may be slightly different from that of facet 902C.

In some embodiments, one or more of facets 902A-D may have surface roughness differences. For example, one facet 902A may have a rougher surface than another facet 902D. The roughness or irregularity of the surface of a facet may cause the variation of the amount of light being reflected and/or the reflection directions. A more polished surface can generally reflect the light better and more accurately according to the desired reflection directions; while a rough surface may scatter the light to different unwanted directions. It is understood that the facet angular uniformity differences, the facet dimensional uniformity differences, the surface form error differences, and the surface roughness differences are examples of many uniformities that may occur among the facets of a multiple-facet light steering device. A light steering device can also have other differences among the facets.

In some embodiments, errors associated with the assembly of a multiple-facet light steering device to a LiDAR scanning system may also occur. For instance, as described above, when assembling a multiple-facet light steering device to a motor for rotating the device, one or more assembly errors may occur, causing variations from device to device. One type of assembly errors is a relative position error between a motor rotor axis and a stator axis. A motor for rotating a multiple-facet light steering device comprises a rotor and a stator. The multiple-facet light steering device is mounted to the rotor and rotates together with the rotor. The stator of the motor does not rotate or otherwise move. The stator of the motor typically comprises electrical windings for generating a magnetic field to rotate the rotor, which is mounted with magnets. Ideally, the stator and the rotor should be concentric. The center axis of the stator and the rotation axis of the rotor should thus be coaxially aligned (e.g., completely overlap). If there is an assembly error and the stator and rotor are not assembled to have the desired concentricity, the rotational movement of the light steering device may be off-centered. In turn, this may cause the scanlines of the LiDAR scanning pattern to deviate from their desired shapes and/or position.

As another example of an assembly error, when assembling the motor for rotating the light steering device to a motor mounting fixture, a relative position error may occur. The motor may thus not be disposed in the desired position of the motor mounting fixture. Because the light steering device is mounted to the motor, this type of position error may cause the light steering device to shift its relative position with respect to the Galvanometer mirror. For example, due to the motor mounting error, the relative angular relation, height relation, horizontal relation, vertical relation, the relative orientations, etc., between the light steering device (e.g., device 702 in FIG. 7A) and the Galvanometer mirror (e.g., mirror 706) may deviate from their respective desired relations. This type of deviation of the relative relations from their desired configurations may also cause the scanlines of the LIDAR scanning pattern to deviate from their desired shape and/or positions.

As another example of an assembly error, when assembling the light steering device and the Galvanometer mirror, a relation position error may occur even if both the light steering device and the Galvanometer mirror themselves are assembled correctly. Similarly, the relative angular relation, height relation, horizontal relation, vertical relation, the relative orientations, etc., between the light steering device (e.g., device 702 in FIG. 7A) and the Galvanometer mirror (e.g., mirror 706) may deviate from their respective desired relations. This type of deviation of the relative relations from their desired configurations may also cause the scanlines of the LIDAR scanning pattern to deviate from their desired shape and/or positions.

As another example of an assembly error, the multiple-facet light steering device may have an angular error between its actual rotating axis and its expected rotating axis. For example, due to an assembly error, the actual rotating axis and the expected rotating axis may not coaxially align (e.g., completely overlap). They may be shifted with respect to each other. They may also form an angle with respect to each other. As a result, during operation, the facets of the light steering device reflect light to directions that deviate from the expected directions. Therefore, this type of deviation of actual rotating axis from its expected rotating axis may also cause the scanlines of the LIDAR scanning pattern to deviate from their desired shape and/or positions.

In mass production, the assembly of one light steering device may produce different results from another light steering device. For example, during operation, the movement of a first light steering device along the undesired radial direction may be greater than that of a second light steering device, due to the assembly variation of the devices. Movement along the radial direction, as opposed to rotating about the axis of the light steering device, may cause the reflected light to deviate from its expected path. As such, movements along the radial direction of the light steering device may also cause the scanlines of the LiDAR scanning pattern to deviate from their desired shape and/or positions.

The above-described manufacturing-caused non-uniformity differences among facets and assembly errors can cause scanline deformation or deviation from its expected shape in the LiDAR scanning pattern. FIG. 9 illustrates an example LiDAR scanning pattern 910 with a zoom-in view of a portion of the pattern according to some embodiments. As described above, because the facets of a light steering device have non-uniformity differences and/or because the assembly process of the light steering device has errors or inaccuracies, the scanlines of the LiDAR scanning pattern may have deformation or deviation from their ideal or expected shape (e.g., straight-line shape). A zoom-in view 920 shows that, for example, the portion 922 of a scanline has non-linear or un-continuous scanline shape, where there are multiple segments having different slopes in the scanline. In other words, due to the manufacturing-caused facet non-uniformity differences and assembly errors, a scanline may deviate from being a straight line at one or more portions of the scanline. The scanline may thus have a nonlinear shape, a piecewise linear shape, segments having different slopes, un-continuous, or any other shape depending on the particular non-uniformity differences and assembly errors. Such deviation from a straight line shape may cause subsequent processing inaccuracy or error (e.g., when processing a point cloud resulted from the scanlines) and in turn perception difficulties.

The present disclosure provides methods and systems for compensating the manufacturing-caused facet non-uniformity differences and assembly errors of the multiple-facet light steering device by intelligently configuring the movement profile of the Galvanometer mirror. As described above, because the multiple-facets steering device and the Galvanometer mirror move at the same time (e.g., steering device is rotating while the Galvanometer mirror is oscillating), the scanlines in a LiDAR scanning pattern generally have non-zero slopes. In other words, the left end and the right end of a scanline may not be the same in the vertical dimension. The slope of a scanline reflects the oscillation of the Galvanometer mirror to scan light in the vertical dimension while the light steering device rotates to produce the scanline from left to right. Therefore, because the scanline has a non-zero slope, the movement profile of the Galvanometer mirror can be configured in such a way to reduce or eliminate the deviation of scanline from its ideal straight line shape caused by the manufacturing-caused facet non-uniformity differences and assembly errors of the multiple-facet light steering device. For example, if the facet non-uniformity differences cause the slope of a particular portion of a scanline to be greater than that it should be (and therefore causes the particular portion to deviate from continuing as a straight line from the previous portion), the movement profile of the Galvanometer mirror can be configured such that the Galvanometer mirror oscillates slower or faster, or even stops momentarily. The controlling of the Galvanometer mirror movement in this manner can thus modify the vertical component of the scanline at the particular portion to compensate the undesired slope deviation caused by the facet non-uniformity differences and assembly errors of the multiple-facet light steering device.

Figure 10:
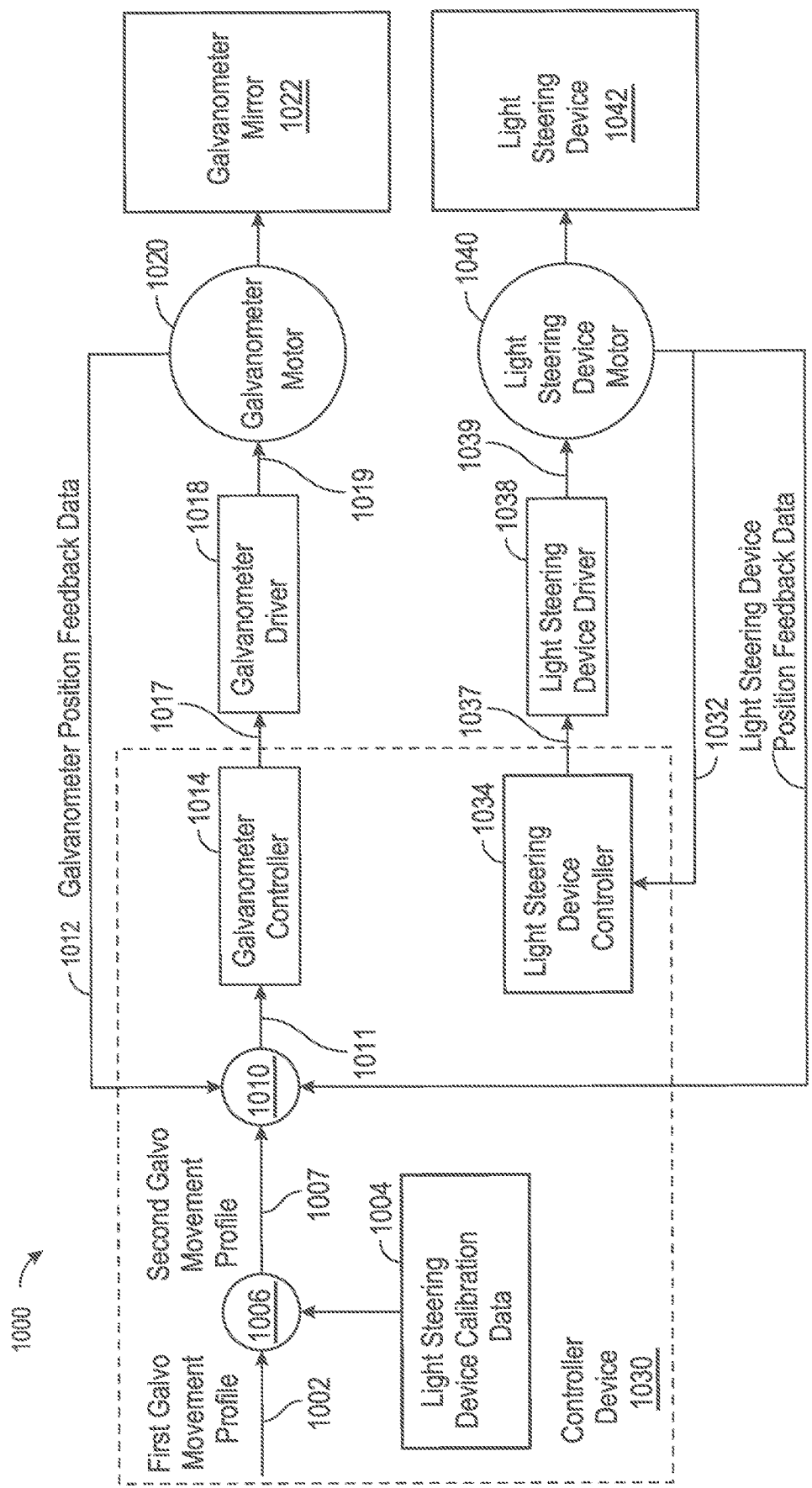
FIG. 10 is a block diagram illustrating using a Galvanometer mirror movement profile to control the mirror positions based on light steering device calibration data and real time position feedback data.

FIG. 10 is a block diagram 1000 for illustrating using a Galvanometer mirror movement profile to modify the mirror position based on light steering device calibration data. In one embodiment, after a multiple-facet light steering device is manufactured (e.g., using a molding-based method) and/or assembled with a motor, the device is calibrated to determine the uniformity differences among the facets and to determine assembly introduced errors or inaccuracies. As described, such uniformity differences include facet angular uniformity differences, facet dimensional uniformity differences, surface form error differences, surface roughness differences, or the like. Assembly errors may include, for example, a relative position error between a motor rotor axis and a stator axis; a relative position error between the motor and a motor mounting fixture; a relative position error of the multiple-facet light steering device with respect to the Galvanometer mirror; and an angular error between an actual rotating axis of the multiple-facet light steering device and an expected rotating axis of the multiple-facet light steering device.

The multiple-facet light steering device can be calibrated to quantify the facets uniformity differences and/or the assembly errors. For instance, these uniformity differences and/or assembly errors can be measured using proper equipment (e.g., instruments for measuring optical components surface roughness, surface curvature, dimensions, angles, or the like). The results of the measurements are stored. In some embodiments, the measurements are compared to expected values or configurations of the various aspects of the light steering device. The results of the comparison (e.g., the differences) are stored as calibration data for generating the movement profile.

With reference to FIG. 10, a Galvanometer movement profile 1002 is provided to a processor 1006. Movement profile 1002 comprises an angular position-time relation associated with movement of the Galvanometer mirror between a first angular position and a second angular position. The first and second angular positions are with respect to an axis about which the Galvanometer mirror rotates or oscillates (e.g., axis 708 of mirror 706 shown in FIG. 7A). Movement profile 1002 can be, for example, movement profile 810 as shown in FIG. 8. In one embodiment, movement profile 1002 represents a position-time relation for a Galvanometer mirror configured to oscillate between the two angular positions without modification to account for facet non-uniformity differences and assembly errors of the light steering device. As one example, the first angular position and the second angular position can be about −20 degrees and about +20 degrees, respectively. Thus, the Galvanometer mirror oscillates to cover about a 40-degree range in one dimension (e.g., the vertical dimension) of the FOV.

As shown in FIG. 10, light steering device calibration data 1004 are also provided to processor 1006. Data 1004 comprise measurement and/or comparison data of a multiple-facet light steering device such as a polygon. As described above, the calibration data comprise measurements of uniformity differences and assembly errors of a particular light steering device. The calibration data typically vary from one light steering device to another. In this instance, the calibration data 1004 is associated with light steering device 1042. Processor 1006 can be implemented by hardware and/or software. It can be a discrete component, a part of Galvanometer controller 1014, the same or a part of another processor 1010, and/or a part of any other components in the LiDAR system. It may also be a processor disposed external to the LiDAR system (e.g., in a cloud computing environment). Processor 1006 receives movement profile 1002 of a Galvanometer mirror 1022 and calibration data 1004 of light steering device 1042 (e.g., a polygon mirror) that is used with the Galvanometer mirror 1022. It performs one or more signal processing operations based on the movement profile 1002 and calibration data 1004. Based on calibration data 1004 and movement profile 1002, processor 1006 generates a Galvanometer movement profile 1007. In one embodiment, movement profile 1007 comprises a position-time relation that is different from a position-time relation of the movement profile 1002, because it takes into account the calibration data 1004. In one embodiment, movement profile 1007 is in the form of Galvanometer mirror position commands.

Movement profile 1007 can be generated using one or more signal processing operations. Some of these signal processing operations include data sampling, filtering, analog-to-digital conversion, superimposing, data compensation, position control, data transformation, digital-to-analog conversion, subtraction, addition, multiplication, division, and/or any other desired operations. Movement profile 1007 represents a movement profile modified from the original movement profile 1002 using the calibration data 1004. For example, based on the calibration data 1004, one or more particular angular positions associated with one or more particular time positions in movement profile 1002 can be modified (increased or decreased) to compensate the facet angular uniformity differences between different facets. Similar modifications can be made to the original movement profile 1002 to account for the assembly errors. As such, the uniformity differences caused by manufacturing and/or assembly errors can be compensated, at least to some extent, such that the Galvanometer mirror 1022 and the light steering device 1042 are controlled to generate improved or desired scanlines (e.g., straight scanlines).

Figure 11:
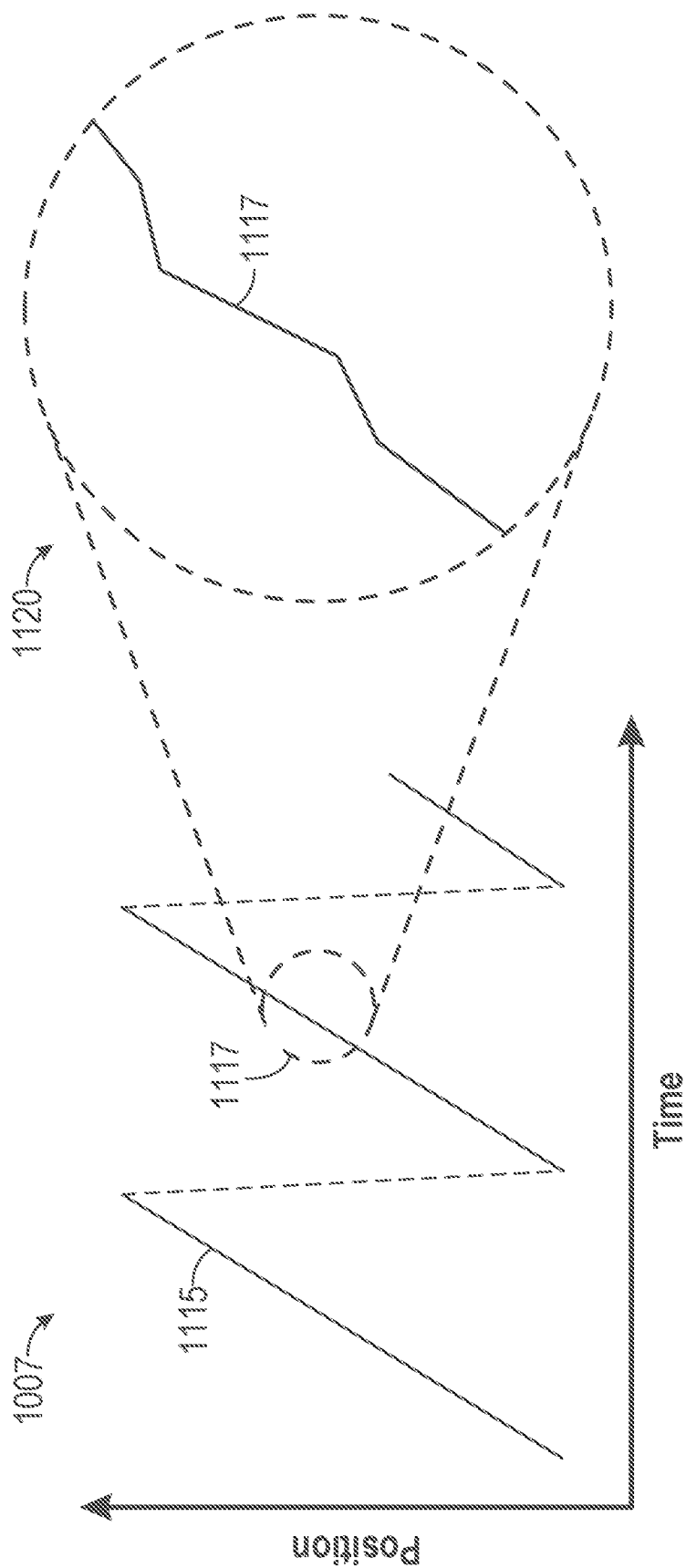
FIG. 11 illustrates an example movement profile of a Galvanometer mirror used to control the mirror positions and a zoom-in view of a portion of the profile according to some embodiments.

FIG. 11 illustrates an example movement profile 1007 that can be used to modify the Galvanometer mirror positions. FIG. 11 also illustrates a zoom-in view of a portion of movement profile 1007 according to some embodiments. Movement profile 1007 is an example profile generated by taking into account of the calibration data 1004 of the light steering device 1042 shown in FIG. 10. Light steering device 1042 can be, for example, device 702, 752, 762, and 902. As described above with respect to FIG. 8, movement profile 810 is an example profile of a Galvanometer mirror without taking into account of the facet non-uniformity differences and assembly errors. Compared to movement profile 810, movement profile 1007 also has an overall sawtooth shape. Unlike profile 810, trajectory 1115 of movement profile 1007 no longer has a straight line. Instead, as shown in the zoom-in view 1120 of a portion 1117 of trajectory 1115, the trajectory may have may segments in a nonlinear shape, a piecewise linear shape, un-continuous, or any other desired shape. The shape, slope, lengths, etc. of the segments in the trajectory 1115 are configured such that the Galvanometer controlled by using trajectory 1115 can compensate, at least to some extent, the facet non-uniformity differences and assembly errors associated with light steering device 1042. As described above, this is performed by configuring trajectory 1115 to increase or decrease the angular position of the Galvanometer mirror at one or more particular time positions. In some embodiments, if the light steering device has five facets, each of the five segments of portion 1117 may correspond to one respective facet for compensating the non-uniformity differences and/or assembly errors of the respective facet. Thus, for a five-facet light steering device, portion 1117 has five corresponding segments that each has a respective slope (or some may have the same slope). Portion 1117 can be repeated. Thus, trajectory 1115 may have a periodically repeating pattern comprising many such repeated portions. By controlling the Galvanometer mirror to oscillate according to trajectory 1115, for example, the scanlines of the LiDAR system can be improved to have desired or expected shapes (e.g., straight lines).

It is understood that in certain circumstances, movement profile 1002 may not need to be modified because calibration data 1004 do not indicate any uniformity differences or assembly errors or because the differences and/or errors are below certain acceptable thresholds. In such cases, the movement profile 1007 may be identical to movement profile 1002.

With reference back to FIG. 10, in some embodiments, movement profile 1007 is provided to a processor 1010. Processor 1010 can be implemented by hardware and/or software. It can be a discrete component, a part of Galvanometer controller 1014, the same or a part of another processor 1006, and/or a part of any other components in the LiDAR system. It may also be a processor disposed external to the LiDAR system (e.g., in a cloud computing environment). Processor 1010 is configured to receive movement profile 1007, Galvanometer position feedback data 1012, and light steering device position feedback data 1032. Based on the received data, processor 1010 can generate one or more adjustment signals 1011. As described above, movement profile 1007 represents an adjusted movement profile modified from the original movement profile 1002 using the calibration data 1004. Therefore, movement profile 1007 can be used to control the movement of the Galvanometer mirror 1022 in a manner to compensate the facet non-uniformity differences and assembly errors associated with light steering device 1042

During operation, the angular positions of Galvanometer mirror 1022 may not always be accurately controlled (e.g., according to movement profile 1007 for mirror 1022) and may have position inaccuracies from time to time. The position inaccuracies may be generated due to many factors such as controller inaccuracies, assembly-caused inaccuracies, inaccuracies caused by optical components manufacturing tolerance, inaccuracies caused by vibration, shock, temperature changes, and/or other environmental changes, etc. For example, a LiDAR system and its components often experience vibration or shock during the operation of a motor vehicle, to which the LiDAR system is mounted. The vibration and shock may affect the position accuracies of one or more optical components in the LiDAR system, including mirror 1022. Therefore, in some embodiments, there will be differences between the expected angular positions included in the movement profile 1007 and the actual angular positions of Galvanometer mirror 1022. To reduce or eliminate such differences, position feedback data 1012 can be taking into account when generating the control signals using the movement profile 1007.

Moreover, in the embodiment shown in FIG. 10, the position inaccuracies of light steering device 1042 can also be taken into account, at least to some extent, by providing position feedback data 1032 associated with the light steering device 1042 to processor 1010. As described above, because light steering device 1042 and mirror 1022 move at the same time, the facets non-uniformity differences and assembly errors of the light steering device 1042 can be compensated, at least to some extent, by intelligently configuring the movement profile of the Galvanometer mirror. Similarly, the position inaccuracies of light steering device 1042 can also be at least partially corrected by further modifying (e.g., tuning) the movement profile 1007. As one example, referring back to FIG. 8, each scanline 822 has a non-zero degree slope. Thus, each data point of a scanline 822 has a corresponding angular position of the light steering device 1042 (e.g., for scanning the horizontal dimension) and a corresponding angular position of Galvanometer mirror 1022 (e.g., for scanning the vertical dimension) at any particular time. If, at a certain time, the angular position of light steering device 1042 is slight greater than its expected position but the angular position of mirror 1022 is unchanged, the resulting portion of the scanline would have a changed slope (e.g., smaller slope). This will cause the scanline to deviate from a desired straight line shaped. By using the real time position data of light steering device 1042, the angular position of mirror 1022 can be modified in real time to at least partially compensate the position inaccuracies of light steering device 1042.

In some embodiments, light steering device 1042 rotates at a very high speed of, for example, a few thousands of rounds per minute (e.g., 9000 rpm). Therefore, controlling the light steering device 1042 directly to correct its speed inaccuracies in a short time period may be difficult or impractical due to its high rotational inertia or momentum. The Galvanometer mirror 1022 typically oscillates at a slower speed and is thus easier to be controlled. Thus, angular position inaccuracies of light steering device 1042 can be compensated at least partially by modifying the movement profile 1007 to control the Galvanometer mirror 1022. In some embodiments, light steering device position feedback data 1032 are provided to a light steering device motor controller 1034 for a more direct correction of the speed inaccuracies of light steering device 1042. For example, based on light steering device position feedback data 1032, if it is determined that the speed of light steering device 1042 are constantly or frequently greater or smaller than the expected speed, light steering device motor controller 1034 may be configured to decrease or increase the rotational speed based on the feedback data 1032. It is understood that light steering device position feedback data 1032 can be provided to directly (by directly controlling light steering device) and/or indirectly (by controlling Galvanometer mirror 1022) in any manner that is desired.

In some embodiments, multiple-facet light steering device 1042 and Galvanometer mirror 1022 each has a rotary position encoder and/or a Hall effect sensor, or any other desired position encoders. The position encoders provide respective position feedback data 1012 and 1032 to processor 1010. Using movement profile 1007, the position feedback data 1012 associated with the Galvanometer mirror 1022, and the position feedback data 1032 associated with the multiple-facet light steering device 1042, processor 1010 generates adjustment signals 1011 by performing one or more of signal processing operations. Some of these signal processing operations include data sampling, filtering, analog-to-digital conversion, superimposing, data compensation, position control, data transformation, digital-to-analog conversion, subtraction, addition, multiplication, division, and/or any other desired operations. Adjustment signals 1011 represent modified movement profiles based on the position feedback data 1012 and/or 1032. For example, based on the position feedback data 1012 and/or 1032, a particular angular position associated with a particular time in movement profile 1007 can be modified (increased or decreased) to compensate the angular position inaccuracy of Galvanometer mirror 1022 and/or angular position inaccuracy of light steering device 1042 during operation. As such, the oscillation trajectory of Galvanometer mirror 1022 can be controlled and adjusted in real time during operation. It is understood that in certain circumstances, movement profile 1007 may not need to be modified because position feedback data 1012 and/or 1032 do not represent any inaccuracy or that the inaccuracy is below a threshold. If there is no inaccuracy or an inaccuracy that is below the threshold, the adjustment signals 1011 may be generated using just the movement profile 1007.

With reference still to FIG. 10, one or more adjustment signals 1011 are provided to Galvanometer controller 1014. Using the adjustment signals 1011, controller 1014 generates control signals 1017 for controlling Galvanometer drive 1018. In some embodiments, control signals 1017 are pulse width modulation (PWM) signals (e.g., 3.3V signals having milliampere current level). These pulse width modulation signals are provided to Galvanometer driver 1018, which can generate a more powerful signal 1019 to drive Galvanometer motor 1020. In one embodiment, Galvanometer driver 1018 includes an amplifier to amplify the input PWM control signal 1017 to generate a 12V PWM signal 1019 having ampere level current. This high-power signal 1019 is then used to drive a Galvanometer motor 1020 to oscillate Galvanometer mirror 1022. In some embodiments, two or more of Galvanometer controller 1014, Galvanometer mirror 1022, motor 1020, a position encoder (not shown), and motor driver 1018 are included in a Galvanometer mirror assembly.

As described above, the angular positions of light steering device 1042 may have position inaccuracies as well and thus position feedback data 1032 can be provided to one or both of processor 1010 and light steering device controller 1034 for at least partially compensating the position inaccuracies of light steering device 1042. Light steering device 1042 can also obtain its angular positions by using a position encoder. The position encoder can be a rotary position encoder and/or a Hall effect sensor, or any other desired position encoders. The position encoder provides position feedback data 1032 to processor 1010 and/or light steering device controller 1034. As described above, using light steering device position feedback data 1032, along with movement profile 1007 and Galvanometer position feedback data 1012, processor 1010 generates adjustment signals 1011.

In one embodiment, using position feedback data 1032, light steering device controller 1034 generates one or more control signals 1037 for directly controlling the light steering device 1042 to compensate for its position inaccuracies. For example, based on position feedback data 1032, a particular angular position of light steering device 1042 at a particular time can be modified (increased or decreased) to compensate the angular position inaccuracy of device 1042 during operation. As such, one or more aspects of the rotational movement (e.g., speed) of light steering device 1042 can be controlled and adjusted in real time during operation. It is understood that in certain circumstances, the rotational movement of light steering device 1042 may not need to be adjusted because position feedback data 1032 indicates that there is no inaccuracy (or that the inaccuracy or error is below a threshold). If there is no inaccuracy or an inaccuracy that is below the threshold, light steering device controller 1034 may not generate any signals for adjusting the movement of the light steering device 1042.

With reference still to FIG. 10, in some embodiments, control signals 1037 are pulse width modulation (PWM) signals (e.g., 3.3V signals having milliampere current level). These pulse width modulation signals are provided to light steering device driver 1038, which can generate a more powerful signal 1039 to drive a light steering device motor 1040. In one embodiment, light steering device driver 1038 includes an amplifier to amplify the input PWM control signal 1037 to generate a 12V PWM signal 1039 having ampere level current. Signal 1039 has a high power and is then used to drive motor 1040 to rotate light steering device 1042. In some embodiments, two or more of light steering device controller 1034, light steering device driver 1038, light steering device motor 1040, a position encoder (not shown), and light steering device 1042 (e.g., a polygon mirror) are included in a multiple-facet light steering device assembly.

With reference to FIG. 10, in some embodiments, processor 1006, processor 1010, Galvanometer controller 1014, and light steering device controller 1034 may be included in a controller device 1030. Controller device 1030 can have one or more processors, memory, and processor-executable instructions stored in the memory. The instructions can be executed by the one or more processors (e.g., 1006 and 1010) to perform one or more steps of the methods described in the present disclosure. Moreover, controller device 1030 may also include storage elements (e.g., memory, hard disk, flash, etc.) for storing the light steering device calibration data 1004. The controller device 1030 can be implemented using, for example, a micro controller, one or more processors, a field programmable gate array (FPGA), a digital signal processor (DSP), and/or any other computing devices that can implement the methods and processing described herein.

By using position feedback data for light steering device 1042 and/or Galvanometer mirror 1022, the movement profile 1007 of Galvanometer mirror 1022 can be further modified to compensate for real time position inaccuracies of one or both light steering device 1042 and mirror 1022, in addition to compensating for the facets non-uniformity differences and assembly errors of the light steering device 1042. In some embodiments, position feedback data for light steering device 1042 are also used directly control device 1042 to compensate for its position inaccuracies. As a result, the deviation of the scanline shapes from their desired shapes (e.g., straight line shapes) can be reduced or eliminated. An improved LiDAR scanning pattern can be obtained for subsequent processing (e.g., perception). The overall performance of the LiDAR system is thus also enhanced. It is understood that the blocks in FIG. 10 are for illustration purposes and they can be separated, combined, added, removed, or changed in any desired manner. For example, processors 1006 and 1010 can be combined with each other or combined with a controller (e.g., controller 1014). A controller and a driver can also be combined in one assembly or device.

Figure 12:
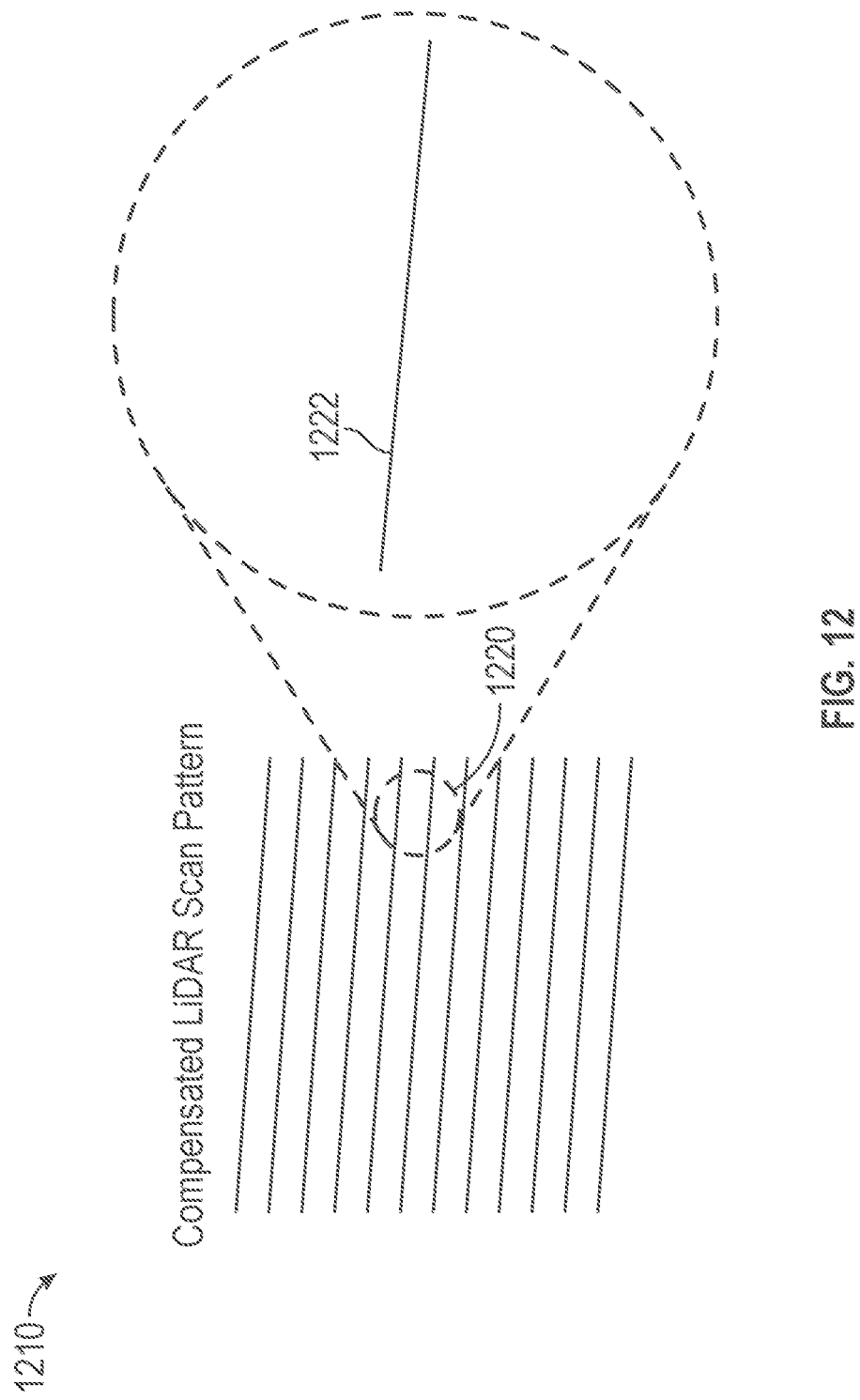
FIG. 12 illustrates an example LiDAR scanning pattern and a zoom-in view of a portion of the pattern according to some embodiments.

FIG. 12 illustrates an example LiDAR scanning pattern 1210 and a zoom-in view of a portion 1220 of the pattern 1210 according to some embodiments. LiDAR scanning pattern 1210 is obtained using the systems and processes described in the present disclosure for compensating one or more of facet non-uniformity differences of the light steering device, assembly errors, and real time position inaccuracies of the light steering device and/or the Galvanometer mirror. As shown in FIG. 12, the LiDAR scanning pattern is compensated such that the scanlines are improved to have a desired or expected shape (e.g., straight lines). Such a scanning pattern improves the efficiency of subsequent processing of, for example, perception using the point cloud data representing the scanning pattern.

FIG. 13 is a flowchart illustrating a method 1300 for controlling a LiDAR scanning system. In some embodiments, method 1300 begins with steps 1302 and 1304. Step 1302 receives a first movement profile of a Galvanometer mirror of a LiDAR scanning system. The first movement profile is, for example, movement profile 810, which does not account for any facet non-uniformity differences and assembly errors of a multiple-facet light steering device. Step 1304 receives calibration data of the multiple-facet light steering device of the LiDAR scanning system. Using the first movement profile and the calibration data, step 1306 generates a second movement profile of the Galvanometer mirror. The second movement profile is a modified profile that can be used to control the Galvanometer mirror in a manner to compensate for the facet non-uniformity differences and assembly errors of the multiple-facet light steering device.

In some embodiments, step 1312 receives position feedback data associated with the Galvanometer mirror. Step 1314 receives position feedback data associated with the multiple-facet light steering device. Using the second movement profile, the received position feedback data of the mirror, and the received position feedback data of the light steering device, step 1316 generates one or more adjustment signals. Based on the adjustment signals, step 1308 generates one or more control signals for controlling a driver of the Galvanometer mirror. In some embodiments, using the position feedback data associated with the multiple-facet light steering device, step 1318 generates one or more control signals for controlling a driver of the light steering device.

In some embodiments, method 1300 may further include steps 1310 that sense angular position of the multiple-facet light steering device and step 1320 that senses angular position of the Galvanometer mirror. The sensed position feedback data are provided to steps 1312 and 1314 respectively. The process can thus be repeated such that the second movement profile (or a previously modified profile) is modified to generate adjustment signals for performing real time control of the light steering device and/or the Galvanometer mirror. As a result, the position inaccuracies of the light steering device and/or the Galvanometer mirror can be corrected or compensated in real time.

The foregoing specification is to be understood as being in every respect illustrative and exemplary, but not restrictive, and the scope of the invention disclosed herein is not to be determined from the specification, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A light detection and ranging (LiDAR) scanning system, comprising:
   a Galvanometer mirror;
   a multiple-facet light steering device; and
   a controller device comprising one or more processors, memory, and processor-executable instructions stored in the memory, the processor-executable instructions comprising instructions for:
      receiving a first movement profile of the Galvanometer mirror of the LiDAR scanning system;
      receiving calibration data of the multiple-facet light steering device of the LiDAR scanning system;
      generating a second movement profile of the Galvanometer mirror based on the calibration data and the first movement profile; and
      providing one or more control signals to adjust movement of the Galvanometer mirror based on the second movement profile.

2. The system of claim 1, wherein the first movement profile of the Galvanometer mirror comprises a position-time relation associated with movement of the Galvanometer mirror between a first angular position and a second angular position.

3. The system of claim 2, wherein a difference between the first angular position and the second angular position is about 40 degrees, the first and second angular positions being with respect to an axis about which the Galvanometer mirror oscillates.

4. The system of claim 1, wherein the calibration data of the multiple-facet light steering device comprise data associated with calibration of differences among at least two facets of the multiple-facet light steering device, the differences being caused by a manufacturing process.

5. The system of claim 4, wherein the differences among at least two facets of the multiple-facet light steering device comprise at least one of:
   facet angular uniformity differences;
   facet dimensional uniformity differences;
   surface form error differences; and
   surface roughness differences.

6. The system of claim 1, wherein the calibration data of the multiple-facet light steering device comprise assembly errors associated with an assembling process of the multiple-facet light steering device to the LiDAR scanning system.

7. The system of claim 6, wherein the assembly errors comprise at least one of:
- a relative position error between a motor rotor axis and a motor stator axis;
- a relative position error between a motor and a motor mounting fixture;
- a relative position error of the multiple-facet light steering device with respect to the Galvanometer mirror; and
- an error between an actual rotating axis of the multiple-facet light steering device and an expected rotating axis of the multiple-facet light steering device.

8. The system of claim 1, wherein generating the second movement profile of the Galvanometer mirror based on the calibration data and the first movement profile comprises:
- performing one or more signal processing operations using the calibration data and the first movement profile, the one or more signal processing operations including at least one of:
- data sampling;
- filtering;
- analog-to-digital conversion;
- data calibration and compensation;
- superimposing;
- data transformation; and
- digital-to-analog conversion.

9. The system of claim 1, wherein the second movement profile comprises a position-time relation that is different from a position-time relation of the first movement profile.

10. The system of claim 1, wherein the multiple-facet light steering device comprises a polygon mirror.

11. The system of claim 1, wherein providing the one or more control signals to adjust the movement of the Galvanometer mirror based on the second movement profile comprises:
- receiving position feedback data associated with the Galvanometer mirror;
- receiving position feedback data associated with the multiple-facet light steering device; and
- generating one or more adjustment signals based on the second movement profile, the position feedback data associated with the Galvanometer mirror, and the position feedback data associated with the multiple-facet light steering device.

12. The system of claim 11, wherein generating the one or more adjustment signals comprises:
- performing one or more signal processing operations using the second movement profile, the position feedback data associated with the Galvanometer mirror, and the position feedback data associated with the multiple-facet light steering device, the signal processing operations including at least one of:
- data sampling;
- filtering;
- analog-to-digital conversion;
- data calibration and compensation;
- superimposing;
- data transformation; and
- digital-to-analog conversion.

13. The system of claim 11, further comprising generating, based on the one or more adjustment signals, the one or more control signals for controlling a driver of the Galvanometer mirror.

14. The system of claim 13, wherein the one or more control signals for controlling the driver of the Galvanometer mirror comprise pulse width modulation signals.

15. The system of claim 1, further comprising a Galvanometer mirror assembly, the Galvanometer mirror assembly comprising:
- a first motor;
- the Galvanometer mirror; and
- a first motor driver configured to oscillate the Galvanometer mirror in accordance with the one or more control signals.

16. The system of claim 15, wherein the Galvanometer mirror assembly further comprises a mirror position encoder configured to provide position feedback data associated with the Galvanometer mirror.

17. The system of claim 1, wherein the processor-executable instructions further comprise instructions for:
- receiving position feedback data associated with the multiple-facet light steering device; and
- providing one or more second control signals to adjust movement of the multiple-facet light steering device based on the position feedback data associated with the multiple-facet light steering device.

18. The system of claim 17, further comprising a multiple-facet light steering device assembly, the multiple-facet light steering device assembly comprising:
- a second motor;
- the multiple-facet light steering device comprising a polygon mirror having a plurality of reflective surfaces; and
- a second motor driver configured to rotate the multiple-facet light steering device in accordance with the one or more second control signals.

19. A method for controlling a light detection and ranging (LiDAR) scanning system, the method being performed by one or more processors and memory, the method comprising:
- receiving a first movement profile of a Galvanometer mirror of the LiDAR scanning system;
- receiving calibration data of a multiple-facet light steering device of the LiDAR scanning system;
- generating a second movement profile of the Galvanometer mirror based on the calibration data and the first movement profile; and
- providing one or more control signals to adjust movement of the Galvanometer mirror based on the second movement profile.

20. The method of claim 19, wherein the first movement profile of the Galvanometer mirror comprises a position-time relation associated with movement of the Galvanometer mirror between a first angular position and a second angular position.

21. The method of claim 19, wherein the calibration data of the multiple-facet light steering device comprise data associated with calibration of differences among at least two facets of the multiple-facet light steering device, the differences being caused by a manufacturing process.

22. The method of claim 19, wherein the calibration data of the multiple-facet light steering device comprise assembly errors associated with an assembling process of the multiple-facet light steering device to the LiDAR scanning system.

23. The method of claim 19, wherein generating the second movement profile of the Galvanometer mirror based on the calibration data and the first movement profile comprises:
- performing one or more signal processing operations using the calibration data and the first movement profile, the one or more signal processing operations including at least one of:

data sampling;
filtering;
analog-to-digital conversion;
data calibration and compensation;
superimposing;
data transformation; and
digital-to-analog conversion.

24. The method of claim 19, wherein the second movement profile comprises a position-time relation that is different from a position-time relation of the first movement profile.

25. The method of claim 19, wherein providing the one or more control signals to adjust movement of the Galvanometer mirror based on the second movement profile comprises:
   receiving position feedback data associated with the Galvanometer mirror;
   receiving position feedback data associated with the multiple-facet light steering device; and
   generating one or more adjustment signals based on the second movement profile, the position feedback data associated with the Galvanometer mirror, and the position feedback data associated with the multiple-facet light steering device.

26. The method of claim 25, wherein generating the one or more adjustment signals comprises performing one or more signal processing operations using the second movement profile, the position feedback data associated with the Galvanometer mirror, and the position feedback data associated with the multiple-facet light steering device; and the method further comprising:
   generating, based on the one or more adjustment signals, the one or more control signals for controlling a driver of the Galvanometer mirror.

27. The method of claim 19, further comprising:
   receiving position feedback data associated with the multiple-facet light steering device; and
   providing one or more second control signals to adjust movement of the multiple-facet light steering device based on the position feedback data associated with the multiple-facet light steering device.

28. A non-transitory computer readable medium storing processor-executable instructions comprising instructions which, when executed by one or more processors of an electronic device, cause the electronic device to perform processing comprising:
   receiving a first movement profile of a Galvanometer mirror of the LiDAR scanning system;
   receiving calibration data of a multiple-facet light steering device of the LiDAR scanning system;
   generating a second movement profile of the Galvanometer mirror based on the calibration data and the first movement profile; and
   providing one or more control signals to adjust movement of the Galvanometer mirror based on the second movement profile.

29. A vehicle comprising a light detection and ranging (LiDAR) scanning system, the LiDAR system comprising:
   a Galvanometer mirror;
   a multiple-facet light steering device; and
   a controller device comprising one or more processors, memory, and processor-executable instructions stored in the memory, the processor-executable instructions comprising instructions for:
      receiving a first movement profile of the Galvanometer mirror of the LiDAR scanning system;
      receiving calibration data of the multiple-facet light steering device of the LiDAR scanning system;
      generating a second movement profile of the Galvanometer mirror based on the calibration data and the first movement profile; and
      providing one or more control signals to adjust movement of the Galvanometer mirror based on the second movement profile.

* * * * *